(12) United States Patent
Goodman et al.

(10) Patent No.: US 9,714,771 B1
(45) Date of Patent: Jul. 25, 2017

(54) DYNAMICALLY PROGRAMMABLE THERMOSTAT

(71) Applicant: Alarm.com Incorporated, Vienna, VA (US)

(72) Inventors: Daniel Goodman, Needham, MA (US); Craig Carl Heffernan, Oregon City, OR (US)

(73) Assignee: Alarm.com Incorporated, Tysons, VA (US)

( * ) Notice: Subject to any disclaimer, the term of this patent is extended or adjusted under 35 U.S.C. 154(b) by 496 days.

(21) Appl. No.: 14/447,237

(22) Filed: Jul. 30, 2014

Related U.S. Application Data

(60) Provisional application No. 61/859,830, filed on Jul. 30, 2013.

(51) Int. Cl.
G05B 19/04 (2006.01)
F24F 11/00 (2006.01)

(52) U.S. Cl.
CPC ........ F24F 11/0009 (2013.01); G05B 19/041 (2013.01); G05B 2219/2614 (2013.01)

(58) Field of Classification Search
None
See application file for complete search history.

(56) References Cited

U.S. PATENT DOCUMENTS

| | | | | |
|---|---|---|---|---|
| 8,757,507 | B2 * | 6/2014 | Fadell | F24F 11/0012 236/94 |
| 2003/0057289 | A1 * | 3/2003 | Smole | F24F 7/00 236/49.3 |
| 2010/0114382 | A1 * | 5/2010 | Ha | F24F 11/006 700/276 |
| 2010/0141153 | A1 * | 6/2010 | Recker | H05B 33/0803 315/149 |
| 2014/0018969 | A1 * | 1/2014 | Forbes, Jr. | H02J 3/32 700/295 |
| 2014/0070919 | A1 * | 3/2014 | Jackson | G08C 17/02 340/5.61 |

* cited by examiner

Primary Examiner — Tuan Dao
(74) Attorney, Agent, or Firm — Fish & Richardson P.C.

(57) ABSTRACT

Programmable controller technology, in which data is received that identifies a particular type of HVAC system component that is to be controlled by a programmable controller. Based on receiving data identifying the particular type of HVAC system component, configuration information is accessed for the particular type of HVAC system component. A configuration is determined for one or more interface ports of the programmable controller based on the configuration information for the particular type of HVAC system component. The interface ports of the programmable controller are configured according to the determined configuration. A connection between the particular type of HVAC system component and the programmable controller that satisfies the determined configuration is detected. Based on detecting the connection between the particular type of HVAC system component and the programmable controller that satisfies the determined configuration, the particular type of HVAC system component is controlled through the one or more interface ports.

19 Claims, 8 Drawing Sheets

DYNAMICALLY PROGRAMMABLE THERMOSTAT

CROSS REFERENCE TO RELATED APPLICATIONS

The present application claims the benefit of U.S. Provisional Application No. 61/859,830, filed Jul. 30, 2013, which is incorporated herein by reference in its entirety for all purposes.

TECHNICAL FIELD

This application relates to a configurable control device.

BACKGROUND

Heating, ventilation, and air conditioning (HVAC) systems can utilize control devices such as thermostats to allow users of a property associated with the HVAC system to control environmental conditions within the property. In some cases, different HVAC system control devices may be compatible with different HVAC system components, such as different air conditioners, furnaces, humidifiers, fans, boilers, or other HVAC system components.

SUMMARY

Techniques are described for the control of an HVAC system associated with a property using a dynamically programmable thermostat device.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description and the drawings.

DETAILED DESCRIPTION

Techniques are described for providing indoor environmental control. In some implementations, a control system includes a dynamically programmable thermostat and is able to control the environment within a home, business, vacation, or other property based on the programming of the thermostat. The control system utilizes the programmed thermostat to achieve control of heating, ventilation, and air conditioning (HVAC) systems associated with the property. The dynamically programmable thermostat can feature terminals that are adaptable to support the function of various HVAC system components. Based on determining a type of HVAC system component, e.g., air conditioner, furnace, fan, humidifier, dehumidifier, etc., to be controlled by a particular terminal of the dynamically programmable thermostat, the thermostat can update the terminal's operation to control operation of the particular HVAC system component. The dynamically programmable thermostat can access functioning parameters corresponding to HVAC system components coupled to the thermostat and can dynamically access and update processes used to control the HVAC system components. Use of the dynamically programmable thermostat can provide improved energy efficiency and/or reduce the required hardware to operate HVAC systems.

In some implementations, the control system can operate a single thermostat as a dynamically programmable thermostat that permits each terminal of the thermostat to be used for a variety of functions, such as operating an air conditioner, furnace, circulation fan, humidifier, dehumidifier, or other HVAC system component. The dynamically programmable thermostat can receive information identifying or can determine a component of an HVAC system connected to a terminal of the dynamically programmable thermostat and can use web-based or mobile applications to access and provide installation instructions to an installer of the dynamically programmable thermostat, HVAC system, and/or HVAC system components. Processes obtained locally or over one or more networks can enable the dynamically programmable thermostat to operate components of an HVAC system and/or to control and/or coordinate the operation of the HVAC system components.

Figure 1A:
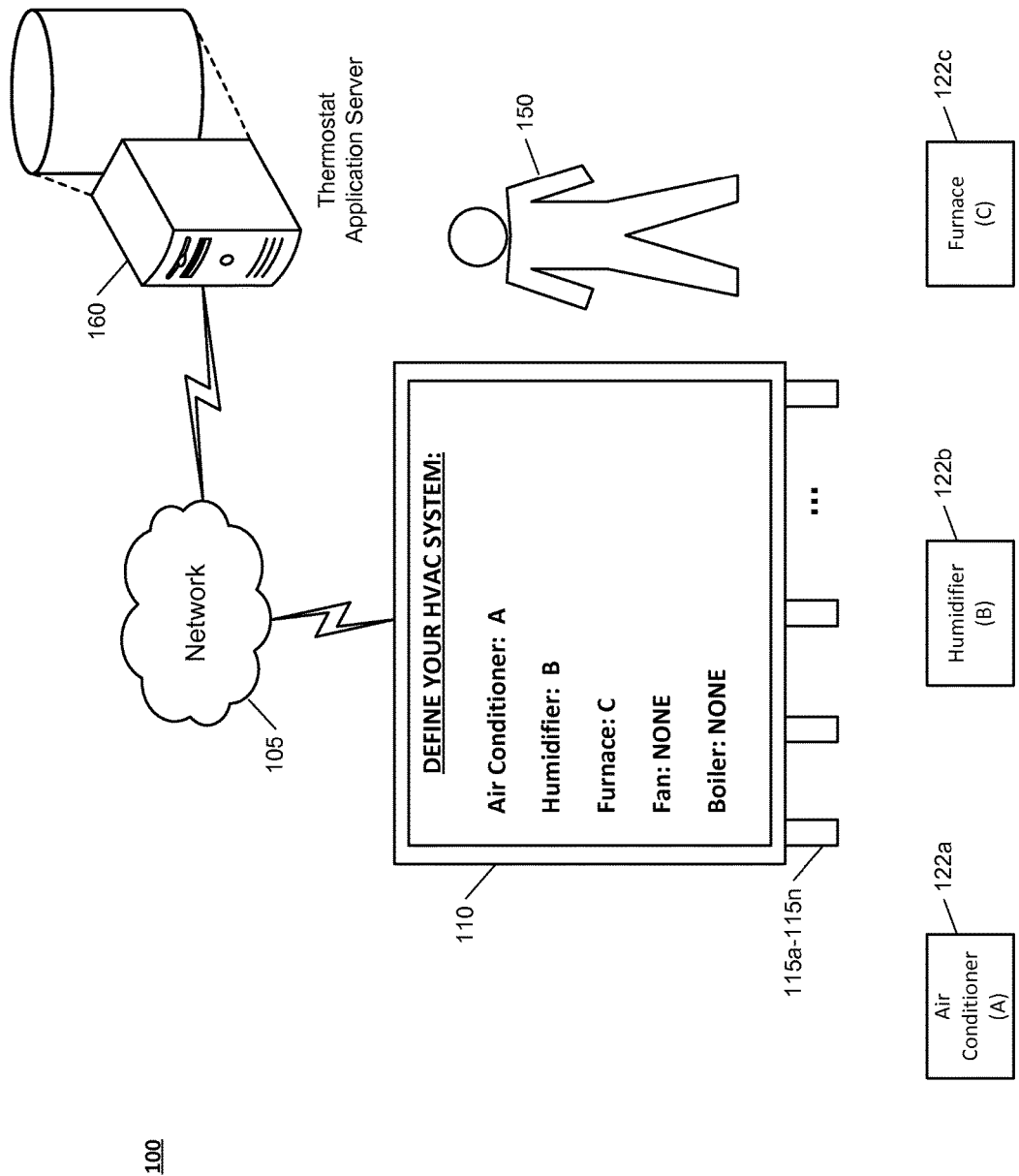
FIGS. 1A-1B illustrate an example of configuring an HVAC system using a dynamically programmable thermostat.
Figure 1B:
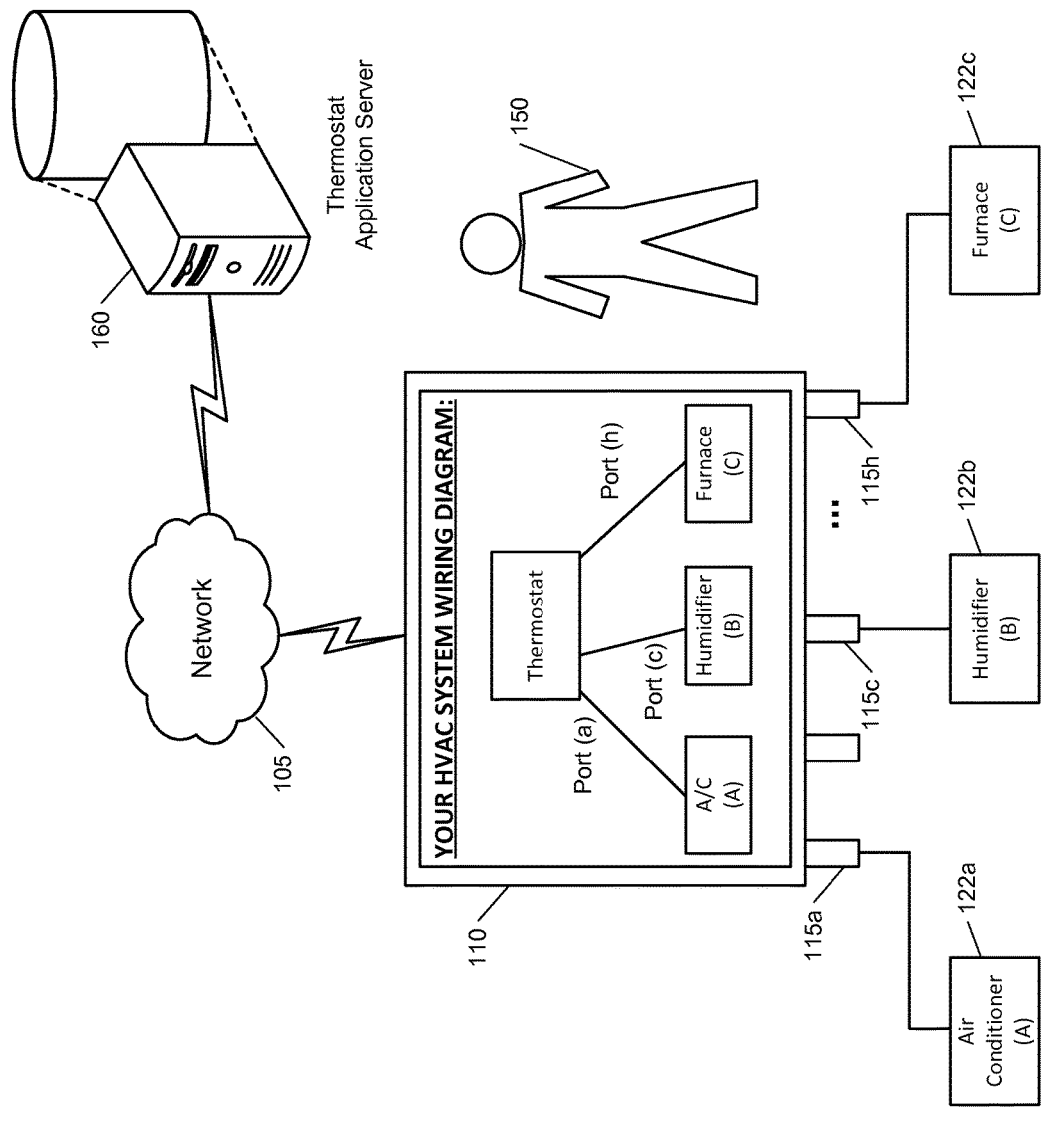

FIGS. 1A and 1B illustrate an example application in which a dynamically programmable thermostat is used to configure an HVAC system associated with a property. For example, a user of a property may want to configure one or more HVAC system components that are part of an HVAC system associated with a property, such that the one or more HVAC system components are controlled by the dynamically programmable thermostat.

In the example shown in FIG. 1A, a control system 100 features a dynamically programmable thermostat 110, a thermostat application server 160, and HVAC system components 122a-122c. The dynamically programmable thermostat 110 is associated with relays 115a-115n or other interface ports that enable the dynamically programmable thermostat 110 to connect to the HVAC system components 122a-122c for purposes of communicating and/or controlling the HVAC system components 122a-122c. The dynamically programmable thermostat 110 is also able to communicate with the thermostat application server 160 over a network 105. The thermostat application server can receive and provide information to the dynamically programmable thermostat 110 relating to the configuration, installation, and/or control of the HVAC system 100 associated with the property.

As shown in FIG. 1A, a user 150 associated with a property may desire to install and configure an HVAC system 100 associated with a property. The HVAC system 100 being installed and configured by the user can include an air conditioner 122a, a humidifier 122b, and a furnace 122c. The air conditioner 122a may be associated with an identifier (A) that indicates additional information about the air conditioner 122a, e.g., a particular brand, model, design, etc., of the air conditioner 122a. Similarly, the humidifier 122b may be associated with an identifier (B) that indicates additional information about the humidifier 122b, and the furnace 122c may be associated with an identifier (C) that indicates additional information about the furnace 122c. The user 150 may provide information to the dynamically programmable thermostat 110 that specifies information about the HVAC system components 122a-122c to be controlled by the dynamically programmable thermostat 110. For example, the user 150 may provide information at an interface of the dynamically programmable thermostat 110 that identifies the HVAC system components 122a-122c. This provided information may indicate that the air conditioner 122a with the identifier (A), the humidifier 122b with the identifier (B), and the furnace 122c with the identifier (C) are to be controlled by the dynamically programmable thermostat 110. In some implementations, the dynamically programmable thermostat 110 may be configurable to control a number of different HVAC system component types, such as one or more air conditioners, humidifiers, furnaces, fans, boilers, etc., and the user 150 may specify which of those HVAC system component types are to be controlled by the dynamically programmable thermostat 110. For instance, the user 150 may specify that the air conditioner 122a, humidifier 122b, and furnace 122c are to be controlled by the dynamically programmable thermostat 110, and that neither a fan nor a boiler are to be controlled by the dynamically programmable thermostat 110. The user 150 may also specify the additional information about one or more of the HVAC system components 122a-122c. In some implementations, the dynamically programmable thermostat 110 may be able to determine the types of HVAC system components connected to the relays 115a-115n of the dynamically programmable thermostat 110, such that the dynamically programmable thermostat 110 can identify the HVAC system components without input from the user 150.

Based on the user 150 specifying the HVAC system components 122a-122c that are to be controlled by the dynamically programmable thermostat 110, the dynamically programmable thermostat 110 can communicate with the thermostat application server 160 to obtain information related to configuring the HVAC system 100 to control the HVAC system components 122a-122c. For example, the dynamically programmable thermostat 110 can transmit information to the thermostat application server 160 over the network 105, where the transmitted information identifies the HVAC system components 122a-122c that the dynamically programmable thermostat 110 is to control. Additionally, in some implementations, the dynamically programmable thermostat 110 may transmit additional information relevant to configuring and/or controlling the HVAC system components 122a-122c to the thermostat application server 160. For example, the dynamically programmable thermostat 110 may transmit information that identifies the dynamically programmable thermostat 110 (e.g., a manufacturer and model of the dynamically programmable thermostat 110), may transmit information identifying or associated with the property associated with the control system 100 (e.g., a location of the property, a floor plan of the property, etc.), or may transmit other information.

Based on receiving the configuration information from the dynamically programmable thermostat 110, the thermostat application server 160 can determine configuration and control information usable to enable the configuration of the dynamically programmable thermostat 110 for control of the HVAC system components 122a-122c. For example, the thermostat application server 160 can receive the information from the dynamically programmable thermostat 110 that identifies the HVAC system components 122a-122c and/or other information associated with the HVAC system components 122a-122c, and can determine a configuration for the HVAC system components 122a-122c and the dynamically programmable thermostat 110 that enables the dynamically programmable thermostat 110 to control the HVAC system components 122a-122c.

For example, in some implementations, the thermostat application server 160 can receive the information identifying the HVAC system components 122a-122c, and based on receiving the information, can identify installation instructions, wiring diagrams, or other information relating to the installation and control of the HVAC system components 122a-122c. In this example, the thermostat application server 160 can be associated with or otherwise be able to access a database that includes installation and control information for a number of different HVAC system components. Based on receiving the information identifying the air conditioner 122a and the identifier (A) of the air conditioner 122a, the thermostat application server can access installation and control information that is specific to the air conditioner 122a having the identifier (A). Such information may include an installation protocol or process, wiring diagram, control process, and/or other information associated with the configuration and control of the air conditioner 122a having the identifier (A). The thermostat application server 160 can also access similar information for the humidifier 122b having the identifier (B) and the furnace 122c having the identifier (C). In some implementations, in addition to accessing the installation and control information for the HVAC system components 122a-122c, the thermostat application server 160 can additionally access information associated with the dynamically programmable thermostat 110, such as information indicating the number of and/or types of relays 115a-115n of the dynamically programmable thermostat 110, information indicating the types of control processes that the dynamically programmable thermostat 110 can execute (e.g., to control digital and/or analog HVAC system components), or other information.

Based on accessing the configuration (e.g., the installation and control) information for the HVAC system components 122a-122c, and the information associated with the dynamically programmable thermostat 110, the thermostat application server 160 can determine a configuration of the HVAC system components 122a-122c and the dynamically programmable thermostat 110 that enables the dynamically programmable thermostat 110 to control the HVAC system components 122a-122c. Determining such a configuration may include determining a wiring arrangement for the HVAC system components 122a-122c and the dynamically programmable thermostat 110, can include determining installation instructions for installing the HVAC system components 122a-122c to be controlled by the dynamically programmable thermostat 110, can include control processes used to control the HVAC system components 122a-122c by the dynamically programmable thermostat 110, or can include other information. The thermostat application server 160 can then provide the dynamically configurable thermostat 110 with the information specifying the determined configuration. For example, the thermostat application server 160 can provide the information specifying the determined configuration to the dynamically programmable thermostat 110 over the network 105. In some implementations, the thermostat application server 160 can access the installation and control information for the HVAC system components 122a-122c and/or the other information associated with the dynamically programmable thermostat 110, and can provide the dynamically programmable thermostat 110 with the configuration information, such that the dynamically programmable thermostat can then determine the configuration for the HVAC system components 122a-122c to be controlled by the dynamically programmable thermostat 110.

As shown at FIG. 1B, the dynamically programmable thermostat 110 can receive the information specifying the determined configuration from the thermostat application server 160, can configure the dynamically programmable thermostat 110 according to the determined configuration, and can provide information for display at the thermostat application server 110 that enables the user 150 associated with the control system 100 of the property to install and configure the HVAC system components 122a-122c to be controlled by the dynamically programmable thermostat 110. For example, the dynamically programmable thermostat 110 can receive the information specifying the configuration of the relays 115a-115n, and can configure the relays 115a-115n to function according to the determined configuration.

Additionally, the dynamically programmable thermostat 110 can receive the information specifying installation instructions and/or a wiring diagram for the HVAC system components 122a-122c, and can generate and provide for display the installation instructions and/or wiring diagram. In some implementations, the dynamically programmable thermostat 110 can generate a visualization of the installation instructions and/or wiring diagram for the HVAC system components 122a-122c to be controlled by the dynamically programmable thermostat 110, or the dynamically programmable thermostat 110 can receive a visualization of the installation instructions and/or wiring diagram, for example, by receiving data corresponding to the visualization of the installation instructions and/or wiring diagram from the thermostat application server 160.

The user 150 can view the visualization of the installation instructions and/or wiring diagram at a display associated with the dynamically programmable thermostat 110, and can proceed to install the HVAC system components 122a-122c according to the installation instructions and/or wiring diagram. For example, the user 150 may be presented with a wiring diagram that shows connections from the various relays 115a-115n of the dynamically programmable thermostat 110 to one or more ports of the HVAC system components 122a-122c. The user 150 may also be presented with other information relating to the installation and configuration of the HVAC system components 122a-122c to be controlled by the dynamically programmable thermostat 110. For example, the user 150 can be presented with information indicating how to connect the HVAC system components 122a-122c to power, how to install the HVAC system components 122a-122c within a property associated with the HVAC system 100, information specifying how to setup or configure the HVAC system components 122a-122c, or other information. The user 150 may be able to use such information to complete the installation and configuration of the HVAC system components 122a-122c such that the HVAC system components 122a-122c are controllable by the dynamically programmable thermostat 110.

Based on the dynamically programmable thermostat 110 being configured according to the determined configuration (e.g., by configuring the relays 115a-115n of the dynamically programmable thermostat 110) and the user 150 completing the configuration of the HVAC system components 122a-122c, the dynamically programmable thermostat 110 can control the HVAC system components 122a-122c. For example, the dynamically programmable thermostat 110 can control the HVAC system components 122a-122c according to one or more control processes received from the thermostat application server 160, one or more control processes determined by or accessible to the dynamically programmable thermostat 110 using the configuration information received from the thermostat application server 160, or one or more control processes that are maintained locally at the dynamically programmable thermostat 110. In some instances, the dynamically programmable thermostat 110 can determine when one or more of the HVAC system components 122a-122c have been connected to the relays 115a-115n in a manner that corresponds to the determined configuration for the HVAC system components 122a-122c to be controlled by the dynamically programmable thermostat 110. Based on determining that the HVAC system components 122a-122c have been connected to the dynamically programmable thermostat 110 according to the determined configuration, the dynamically programmable thermostat 110 can proceed to control the HVAC system components 122a-122c.

Figure 2:
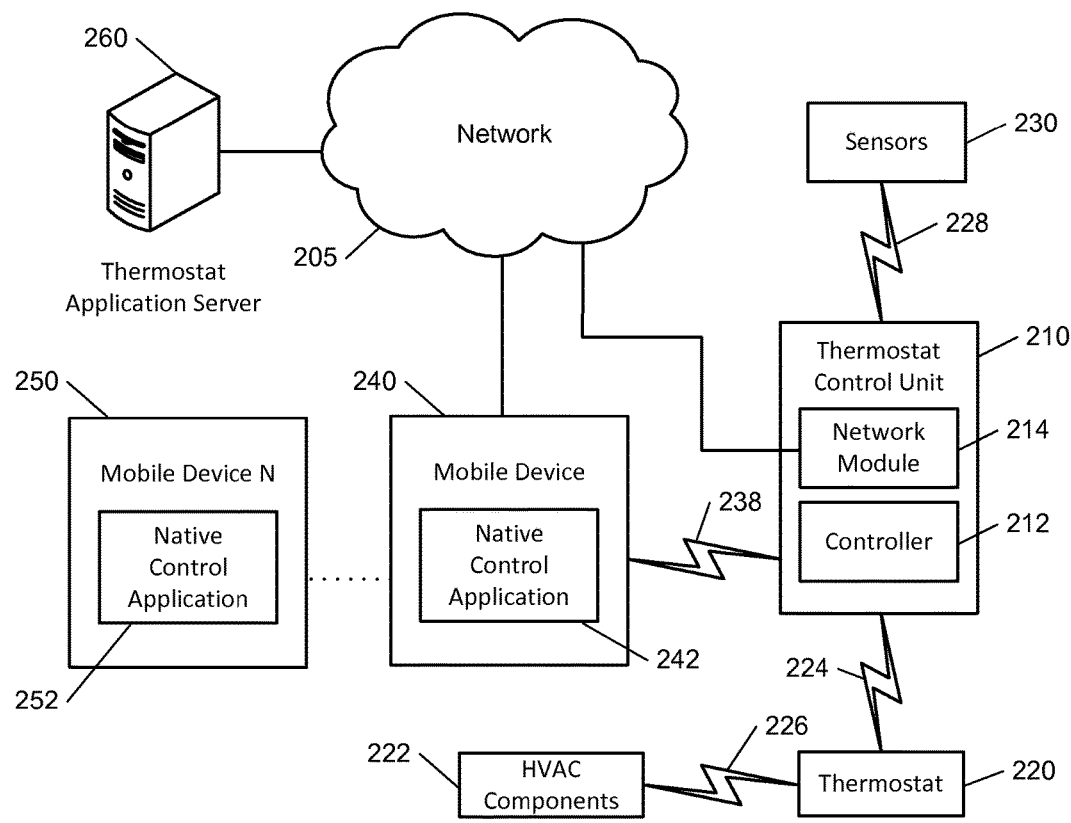
FIG. 2 illustrates an example system capable of enabling the configuration and control of an HVAC system using a dynamically programmable thermostat.

FIG. 2 illustrates an example of a control system 200 featuring a dynamically programmable thermostat used to operate an HVAC system. The control system 200 includes a network 205, a thermostat control unit 210, one or more mobile devices 240, 250, and a thermostat application server 260. In some examples, the network 205 enables communications between the thermostat control unit 210, the one or more mobile devices 240, 250, and the thermostat application server 260.

The network 205 is configured to enable electronic communications between devices connected to the network 205. For example, the network 205 can be configured to enable exchange of electronic communications between the thermostat control unit 210, the one or more mobile devices 240, 250, and the thermostat application server 260.

The network 205 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 205 can include multiple networks or subnetworks, each of which can include, for example, a wired or wireless data pathway. The network 205 can include a circuit-switched network, a packet-switched data network, or any other network able to carry electronic communications, e.g., data or voice communications. For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The thermostat control unit 210 is configured to control a dynamically programmable thermostat 220 and includes a controller 212 and a network module 214. The controller 212 is configured to control a system that includes the thermostat control unit 210, e.g., a system for controlling a dynamically programmable thermostat 220 associated with a property's HVAC system. In some examples, the controller 212 can include a processor or other control circuitry configured to execute instructions of a program that controls operation of the dynamically programmable thermostat 220. In these examples, the controller 212 can be configured to receive inputs from sensors, detectors, one or more servers, or other devices associated with the system 200 and to control operation of the dynamically programmable thermostat 220 that is associated with the property's HVAC system. In some instances, the controller 212 can be configured to control operation of the network module 214 included in the thermostat control unit 210.

The network module 214 is a communication device configured to exchange communications over one or more networks 205. The network module 214 can be a wireless communication module configured to exchange wireless communications over the network 205. For example, the network module 214 can be a wireless communication device configured to exchange communications over a wireless data channel. In this example, the network module 214 can transmit and/or receive data relating to identified HVAC system components connected to terminals of the dynamically programmable thermostat 220, data associated with control processes used to control the components of the HVAC system using the dynamically programmable thermostat 220, environmental data associated with the property, and/or weather forecast data relating to the geographic region of the property. The wireless communication device can include one or more GSM modules, a radio model, a cellular transmission module, or any type of module configured to exchange communications in one of the following formats: GSM or GPRS, CDMA, EDGE or EGPRS, EV-DO or EVDO, UMTS, or IP.

In some implementations, the network module 214 is a wired communication module configured to exchange communications over the network 205 using a wired connection. For instance, the network module 214 can be a modem, a network interface card, or another type of network interface device. The network module 214 can be an Ethernet network card configured to enable the thermostat control unit 210 to communicate over a local area network and/or over the Internet. The network module 214 can also be a voiceband modem configured to enable the thermostat control unit to communicate over the telephone lines of Plain Old Telephone Systems (POTS).

The thermostat control unit 210 associated with the control system communicates with sensors connected to a module 230 and a dynamically programmable thermostat 220 that controls the HVAC system associated with the property. The module 230 is connected to one or more sensors configured to monitor the environment of the property at various locations, e.g., at various indoor and outdoor locations of the property, and can also be configured to monitor activity at the property. For example, the module 230 can be connected to one or more environmental sensors, such as one or more temperature sensors, humidity sensors, noise sensors, light sensors, air quality sensors, smoke detectors, carbon monoxide detectors, water sensors, rain sensors, wind sensors, etc. Sensors for monitoring activity at the property can include, for example, one or more motion sensors, contact sensors, etc. The module 230 connected to the one or more sensors can communicate data obtained by the sensors to the thermostat control unit 210. For example, the module 230 can transmit sensor data indicating environmental conditions at various locations within the property, e.g., a temperature and humidity in each room of a home, and activity within the property, e.g., which rooms of the home are currently occupied, to the thermostat control unit 210.

The dynamically programmable thermostat 220 is configured to monitor temperature and/or energy consumption of an HVAC system associated with the thermostat, and is further configured to dynamically control the operation of the HVAC system. In some instances, the dynamically programmable thermostat 220 may receive data identifying one or more operating processes used by the dynamically programmable thermostat 220 to control an HVAC system. Additionally or alternatively, the dynamically programmable thermostat 220 can send and/or receive information identifying and/or providing information relating to HVAC system components that are connected to terminals of the dynamically programmable thermostat 220. In some implementations, the dynamically programmable thermostat 220 can, additionally or alternatively, receive data relating to environmental conditions at the property, e.g., at various locations indoors and/or outdoors at the property, can receive data identifying weather forecasts for the geographic region of the property, and/or can receive data relating to activity at the property. The dynamically programmable thermostat 220 can directly measure energy consumption of the HVAC system associated with the dynamically programmable thermostat 220, or can estimate energy consumption of the HVAC system associated with the dynamically programmable thermostat 220. The dynamically programmable thermostat 220 can communicate data relating to control of the components of the HVAC system associated with module 222, for example, by communicating data relating to control of the HVAC system components received from the thermostat control unit 210.

In some implementations, the dynamically programmable thermostat 220 can be integrated with the thermostat control unit 210. For example, the dynamically programmable thermostat 220 can include the thermostat control unit 210, e.g., as an internal component to the dynamically programmable thermostat 220. In other implementations, the thermostat control unit 210 can be a gateway device that communicates with the dynamically programmable thermostat 220.

The module 222 is connected to one or more components of an HVAC system associated with the property and is configured to control the operation of the one or more components of the HVAC system. In some implementations, the module 222 is also configured to monitor energy consumption and/or operating parameters of the HVAC system components, for example, by directly or indirectly measuring the energy consumption of the one or more components of the HVAC system or by estimating the energy usage of the one or more components of the HVAC system based on detecting that one or more components of the HVAC system are active. The module 222 can communicate energy monitoring information and/or data identifying the state of the HVAC system components to the module 220 associated with the dynamically programmable thermostat 220 and can control the one or more components of the HVAC system based on commands received from the dynamically programmable thermostat 220.

The dynamically programmable thermostat 220 and the module 230 can communicate with the controller 212 over communications links 224 and 228, and module 222 can communicate with the dynamically programmable thermostat 220 over communication link 226. The communication links 224, 226, and 228 can be wired or wireless data pathways configured to transmit signals from the modules 220, 230 to the controller 212 and from the module 222 to the dynamically programmable thermostat 220. The dynamically programmable thermostat 220 and the modules 222 and 230 can continuously transmit information, can periodically transmit information, or can transmit information in response to a change in sensed values, operating conditions, operating processes, HVAC system component connections, etc.

In some implementations, connections through communication links 224, 226, and 228 can use one or more short-range wireless technologies, such as Bluetooth, Wi-Fi, near field communication (NFC), ZigBee, Z-Wave, dedicated short-range communication (DSRC), or other short-range wireless technologies. In some examples, the communication links 224, 226, and 228 can utilize wired connections such as one or more Ethernet connections, HomePlug (Ethernet over powerline) or other powerline connections, universal serial bus (USB) connections, wired connections based on the RS232, RS485, and/or RS422 standards, or other wired connections. In some instances, the communication links 224, 226, and 228 can communicate over one or more networks, such as one or more local area networks (LAN) or wide area networks (WAN), such as the Internet.

In some implementations, the module 222 associated with one or more components of an HVAC system can communicate directly with the thermostat control unit 210. For example, the thermostat control unit 210 can communicate with the module 222 to send and/or receive information related to controlling the components of the HVAC system components, information relating to the energy usage of the HVAC system components, or other information. In some instances, the dynamically programmable thermostat 220 can communicate information to the thermostat control unit 210, and the thermostat control unit 210 can communicate the information received from the dynamically programmable thermostat 220 to the module 222 associated with the one or more HVAC system components.

The thermostat application server 260 is an electronic device configured to provide control services by exchanging electronic communications with the thermostat control unit 210 and the one or more mobile devices 240, 250 over the one or more networks 205. For example, the thermostat application server 260 can be configured to monitor data obtained by the thermostat control unit 210. In this example, the thermostat application server 260 can exchange electronic communications with the network module 214 included in the thermostat control unit 210 to send and/or receive information regarding HVAC system components connected to the dynamically programmable thermostat 220, operating processes relating to the property's HVAC system, information regarding the environment at the property, and/or weather forecast data for the geographic region of the property. In some implementations, the thermostat application server 260 can exchange communications with the one or more mobile devices 240, 250 to send and/or receive information relating to the operation of the property's HVAC system. For example, the thermostat application server 260 can send and/or receive information from the one or more mobile devices 240, 250 that indicates updates to operating processes relating to the property's HVAC system, and/or can enable access or monitoring of the operation of the HVAC system by a user or technician associated with the HVAC system.

In some implementations, the thermostat application server 260 can access weather data and/or weather forecast data for the geographic region of the property, and the weather data and/or weather forecast data can be used in determining control of the HVAC system associated with the property. For example, the thermostat application server 260 can be connected to the Internet over one or more networks 205 and can access weather data and/or weather forecast data at a website or database that is accessible on the Internet. The weather data can include current weather data for the geographic region of the property, such as a current temperature, humidity, due point, wind chill, heat index, barometric pressure, etc., and weather forecast data can include short and/or long term weather forecasts, for example, short and long term temperature forecasts, precipitation forecasts, etc.

The thermostat application server 260 can store data, e.g., data relating to HVAC system component connections, HVAC system operating processes, weather data, and/or weather forecast data. In some instances, the thermostat application server 260 can receive the data from the thermostat control unit 210, the mobile devices 240, 250, and/or the Internet, and can perform analysis of the stored data. Based on the analysis, the thermostat application server 260 can communicate with the thermostat control unit 210, for example, to provide HVAC system component connectivity information, HVAC system operating processes, or other information relating to the operation of the HVAC system associated with the property.

The one or more mobile devices 240, 250 are devices that host one or more native applications, e.g., the native control applications 142, 152. The one or more mobile devices 240, 250 can be cellular phones or non-cellular locally networked devices. The one or more mobile devices 240, 250 can include a cell phone, a smart phone, a tablet computer, a personal digital assistant ("PDA"), a laptop computer, desktop computer, or any other device configured to communicate over a network. For example, implementations can also include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 240, 250 can be the same or can include mobile devices of different types. The one or more mobile devices 240, 250 can perform functions unrelated to the control system, such as placing personal telephone calls, playing music, playing video, displaying pictures, browsing the Internet, maintaining an electronic calendar, etc.

In some implementations, the one or more mobile devices 240, 250 communicate with and receive control system data from the thermostat control unit 210 using the communication link 238. For instance, the one or more mobile devices 240, 250 can communicate with the thermostat control unit 210 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 240, 250 can connect locally to the control system and its sensors and other devices, or can connect to the control system and its sensors or other devices over one or more networks 205. In some instances, a local connection can improve the speed of communications because communicating through the network 205 with a remote server, e.g., the control application server 260, can be slower.

Although the one or more mobile devices 240, 250 are shown communicating with the thermostat control unit 210, the one or more mobile devices 240, 250 can communicate directly with the sensors and other devices controlled by the thermostat control unit 210. In some implementations, the one or more mobile devices 240, 250 replace the thermostat control unit 210 and perform the functions of the thermostat control unit 210 for local control and long range or offsite communication.

In other implementations, the one or more mobile devices 240, 250 receive control system data captured by the thermostat control unit 210 through the network 205. The one or more mobile devices 240, 250 can receive the data from the thermostat control unit 210 through the network 205, or the control application server 260 can relay data received from the thermostat control unit 210 to the one or more mobile devices 240, 250 through the network 205. In this regard, the control application server 260 can facilitate communications between the one or more mobile devices 240, 250 and the thermostat control unit 210.

Although the one or more mobile devices 240, 250 are shown in FIG. 2 as being connected to the network 205, in some implementations, the one or more mobile devices 240, 250 are not connected to the network 205. In these implementations, the one or more mobile devices 240, 250 communicate directly with one or more of the control system components and no network connection, e.g., connection to the Internet, or reliance on remote servers is needed.

In some implementations, the one or more mobile devices 240, 250 are used in conjunction with only the sensors, the components of the HVAC system associated with the property, and the dynamically programmable thermostat 220. In these instances, the control system 200 only includes the one or more mobile devices 240, 250, the dynamically programmable thermostat 220, and the modules 222 and 230 associated with the HVAC system components and the sensors at the property, respectively. The one or more mobile devices 240, 250 receive data directly from the dynamically programmable thermostat 220 and the modules 222 and 230, and send data directly to the dynamically programmable thermostat 220 and the modules 222 and 230. The one or more mobile devices 240, 250 provide the appropriate interfaces/processing to provide control information, modify settings and/or processes, set or control the dynamically programmable thermostat 220, control HVAC system component operations, etc.

The one or more mobile devices 240, 250 can each include a native control application 142, 152, respectively. The native control application 142, 152 refers to a software/firmware program running on the mobile devices that enables the features described below. The one or more mobile devices 240, 250 can load or install the native control application 142, 152 based on data received over one or more networks, such as one or more networks 205, or based on data received from local media. The native monitoring application 142, 152 can run on operating platforms associated with the mobile devices 240, 250, such as Apple iOS, iPhone, iPod touch, Blackberry, Google Android, Windows Mobile, etc.

The control system 200 includes the thermostat 220 that can be dynamically programmed to control any number of HVAC system configurations and combinations of HVAC system components. In some instances, the dynamically programmable thermostat 220 can be a wall-mounted thermostat device that features one or more 24 Volt (V) relays for connection to components of an HVAC system. The dynamically programmable thermostat 220 can adapt the one or more 24 V relays to operate any number of HVAC system components, such as an air conditioner, fan, furnace, humidifier, dehumidifier, external air baffle, etc. By featuring adaptable relays, the dynamically programmable thermostat 220 can support a number of potential HVAC system configurations without requiring the hardware to support each configuration simultaneously. For example, a single relay and output terminal associated with the dynamically programmable thermostat 220 can be used to operate one of an external air baffle, a humidifier, or a dehumidifier based on the configuration of that particular relay associated with the dynamically programmable thermostat 220.

In some implementations, configuring a relay of a dynamically programmable thermostat 220 to operate a particular HVAC system component can include configuring the dynamically programmable thermostat 220 to support the operation of the particular HVAC system component. In some instances, configuring the dynamically programmable thermostat 220 is performed by accessing a web-based or mobile application, for example, by accessing a web-based or mobile application at the thermostat application server 260 over one or more networks 205. Additionally or alternatively, the dynamically programmable thermostat 220 can be configured to operate a particular HVAC system component by accessing information stored locally at the thermostat.

In some implementations, configuring a relay of the dynamically programmable thermostat 220 to operate a particular HVAC system component can include accessing instructions relating to installing and/or wiring the particular HVAC system component and outputting instructions relating to installing and/or wiring the particular HVAC component to a user or installer of the component. For example, the dynamically programmable thermostat 220 can access and output, for example, at a display of the thermostat, information identifying wiring diagrams and/or installation instructions for a humidifier component based on determining that an installer or user of the thermostat is attempting to install a humidifier for the HVAC system. In some instances, the instructions relating to installing and/or wiring the particular HVAC component can be accessed over one or more networks 205, for example, at the thermostat application server 260 or at a website or database accessible on the Internet. In some instances, the instructions to install and/or wire the particular HVAC component can be accessed locally at the dynamically programmable thermostat 220.

In some implementations, a display associated with the dynamically programmable thermostat 220 can be an electrophoretic ink (E Ink) display, such as those provided by E Ink Corporation, or any other bi-stable, high contrast, low power display. The electrophoretic display can output instructions, wiring diagrams, schematics, and/or other information relating to the configuration or operation of HVAC system components. Integration of an electrophoretic ink display can enable the dynamically programmable thermostat 220 to output detailed instructions and other information, while maintaining energy efficient operation of the thermostat.

In some implementations, a display associated with the dynamically programmable thermostat can be dynamic in that it enables users to determine information that is and is not presented at the display. For example, a user can interact with the display of the dynamically programmable thermostat to specify information that can be provided for output at the display. Information not output at the display of the dynamically programmable thermostat can be viewable at another interface, such as by accessing a web or mobile-based application at the mobile devices 240, 250. By enabling the end user to customize the display of the dynamically programmable thermostat, the display is not burdened with displaying complex graphics or information, since such information may be accessible elsewhere. For example, an extensive list of HVAC system component setup types or instructions, e.g., pertaining to a heat pump, gas/electric switch, fan, etc., may not be displayed at a dynamically programmable thermostat if this information is accessible and more easily viewed using an application on a mobile device 240, 250.

In some examples, the dynamically programmable thermostat 220 can identify an HVAC system configuration being controlled by the dynamically programmable thermostat 220, or can determine a particular HVAC system component associated with a particular relay of the thermostat. Based on determining the HVAC system configuration or particular HVAC system component associated with the particular relay, the dynamically programmable thermostat 220 can output instructions and/or wiring diagrams associated with configuring the HVAC system configuration or HVAC system component. For example, the dynamically programmable thermostat 220 can output an image at a display of the thermostat that indicates the proper terminals of the thermostat to which the HVAC system or component wiring should connect.

For example, an HVAC system configuration can include a single heat, single cool system with humidification, and the dynamically programmable thermostat 220 can output, at a display of the thermostat, instructions indicating the required connections between the relays of the thermostat and the wiring of the furnace, air conditioner, and humidifier of the HVAC system. In this example, output instructions may indicate that a user or installer should connect a power wire to a first terminal of the dynamically programmable thermostat 220, a heat wire to a second terminal of the dynamically programmable thermostat 220, a fan wire to a third terminal of the dynamically programmable thermostat 220, a humidifier wire to a fourth terminal of the dynamically programmable thermostat 220, and a cool wire to a fifth terminal of the dynamically programmable thermostat 220. The dynamically programmable thermostat 220 may store configuration data indicating that the first terminal is associated with a power wire, the second terminal is associated with a heat wire, the third terminal is associated with a fan wire, the fourth terminal is associated with a humidifier wire, and the fifth terminal is associated with a cool wire. The stored configuration data may enable the dynamically programmable thermostat 220 to appropriately control the HVAC system with the dynamically established input terminals. To the extent the configuration of the HVAC system changes or the dynamically programmable thermostat 220 is moved to another HVAC system, the terminals may be dynamically reassigned and the configuration data may be updated to reflect the new configuration resulting from reassignment of the terminals.

In some implementations, an HVAC system configuration or a particular HVAC system component is determined based on user inputs indicating a particular HVAC system configuration or a particular HVAC system component that is to be connected to the dynamically programmable thermostat 220. For example, the thermostat can provide a menu interface at a display of the thermostat, and a user or installer of the HVAC system can input information identifying a particular HVAC system configuration or a particular HVAC system component or components that the thermostat will control. In another example, users and/or installers of the HVAC system can input information identifying a particular HVAC system configuration and/or a particular HVAC system component or components at a mobile device 240, 250, for example, using a menu associated with the native control applications 142, 152.

In other implementations, determining a particular HVAC system configuration or one or more HVAC system components is accomplished based on detecting a connection of the HVAC system having the particular configuration to the dynamically programmable thermostat 220 or based on detecting connection of the one or more HVAC system components to the thermostat. For example, software drivers or other information can be received and/or detected by the dynamically programmable thermostat 220 and used to determine that an HVAC system having a particular configuration or one or more particular HVAC system components have been connected to the thermostat. In other examples, data relating to the drivers or information can be transmitted by the dynamically programmable thermostat 220, and the thermostat can receive information identifying the HVAC system configuration and/or the one or more HVAC system components. For example, the thermostat can transmit data relating to the drivers or other information to the thermostat application server 260 via the thermostat control unit 210 and/or over one or more networks 205, and the dynamically programmable thermostat 220 can receive information identifying the particular HVAC system configuration or one or more HVAC system components connected to the thermostat.

In addition to accessing and providing instructions relating to the configuration of an HVAC system or one or more components of an HVAC system, the dynamically programmable thermostat 220 can access and implement processes associated with the operation of the HVAC system or one or more HVAC system components. For example, the dynamically programmable thermostat 220 can access a process associated with the operation of an air conditioner of a property's HVAC system, and can operate the air conditioner based on the process to cool the property to a user-desired temperature. In some instances, the dynamically programmable thermostat 220 can access operating processes locally, for example, at a controller 212 associated with the thermostat control unit 210 integrated with the thermostat 220, at a memory associated with the thermostat, etc. In other implementations, the dynamically programmable thermostat 220 can access operating processes over one or more networks 205, for example, by accessing the processes at the thermostat application server 260 or at a website or database on the Internet.

In some instances, the dynamically programmable thermostat 220 can access the operating processes based on determining that an HVAC system having a particular configuration or one or more particular components of an HVAC system have been configured to operate with the thermostat. For example, the thermostat 220 can access operating processes associated with an air conditioner of an HVAC system based on determining that the air conditioner has been configured to operate with the thermostat. In other implementations, the thermostat can access the one or more processes, and based on determining that an HVAC system having a particular configuration or one or more particular HVAC system components have been configured to operate using the thermostat, the dynamically programmable thermostat 220 can implement the proper process.

In some instances, the dynamically programmable thermostat 220 accesses operating processes over one or more networks 205 while a network connection exists, and accesses operating processes locally while a network connection does not exist. For example, the dynamically programmable thermostat 220 can obtain operating processes from the thermostat application server 260, a website, or a database based on the thermostat control unit 210 having a connection to one or more networks 205. Based on the thermostat control unit 210 losing connection to the one or more networks 205, the dynamically programmable thermostat 220 can access operating processes locally and can operate the HVAC system or one or more HVAC system components based on the accessed processes. For example, the dynamically programmable thermostat 220 can locally maintain a process for operating an HVAC system configuration featuring a single heat, single cool, stand-alone humidifier configuration. Based on the thermostat not having access to one or more network connections, the thermostat can operate using the locally available process. Based on determining that a connection to one or more networks 205 becomes available or is reestablished, the dynamically programmable thermostat 220 can access and utilize operating processes specific to the particular HVAC system configuration or the one or more particular HVAC system components featured in the system. In some implementations, accessing and obtaining operating processes can be achieved by a local connection to a device storing or having access to operating processes, for example, by a local connection to a mobile device 240, 250 using a USB, Ethernet, or other connection.

In some implementations, operating processes received by the dynamically programmable thermostat 220 can be stored locally. Storing the processes locally can enable the HVAC system to continue to operate using the received operating processes, regardless of interruptions in network connectivity and/or discontinuance of services related to network connectivity, access to the thermostat application server 260, or access to use of the native control applications 142, 152 loaded at mobile devices 240, 250.

In some instances, processes relating to the operation of a particular HVAC system configuration or one or more particular HVAC system components can be updated by a user, technician, or other individual, and the dynamically programmable thermostat 220 can operate the HVAC system or one or more particular HVAC system components based on the updated process. For example, a user can access a menu or other interface at the dynamically programmable thermostat 220 or using a native control application 142, 152 associated with a mobile device 240, 250, and can update parameters or other inputs to a particular process. The dynamically programmable thermostat 220 can access the updated process, and can operate the HVAC system or one or more components of the HVAC system based on the updated process. For example, an HVAC system can be a two-stage HVAC system and a user of the system may want to turn on each stage of the HVAC based on particular timing. In this example, the user may want the first HVAC system stage to turn on in order to achieve a target temperature within a property, and the user may further want the second HVAC system stage to turn on five minutes after the first HVAC system stage turns on based on the target temperature not being achieved after the five minute period.

Based on receiving one or more processes relating to the operation of an HVAC system associated with a property and/or one or more updated processes relating to the operation of the HVAC system, the dynamically programmable thermostat 220 can execute operations to control the HVAC system based on the received processes. In some instances, the processes can identify one or more controller constant values used by the thermostat to determine on/off cycling of HVAC system components, and the thermostat can operate the HVAC system based on a process that utilizes the controller constant values. For example, the controller constant values can be values relating to a proportional-integral-derivative (PID) controller, and the dynamically programmable thermostat 220 can operate the HVAC system based on the received PID controller values. In other examples, a process received by the dynamically programmable thermostat 220 can be another process, for example, a set of rules or a piece of code, and the thermostat can control the HVAC system based on the received rules or code.

In some implementations, receiving an updated process used by a dynamically programmable thermostat 220 can include replacing or updating a preexisting process with the received, updated process. For example, the dynamically programmable thermostat 220 can maintain a process for controlling an HVAC system associated with a property, and based on receiving an updated process, the dynamically programmable thermostat 220 can update the preexisting process and can control the HVAC system using the updated process. In some instances, using the updated process can include updating values used by a preexisting process to control the HVAC system, and controlling the HVAC system using the process that features the updated values. For example, an updated process may specify updated PID controller values, and the dynamically programmable thermostat 220 can update values associated with a preexisting PID controller with the updated values to control the HVAC system using the updated process. In other instances, the thermostat can utilize an updated process by replacing, editing, or supplementing a set of rules or code associated with a preexisting process with the updated rules or code, and controlling the HVAC system using the updated rule set or code.

In some instances, a process or updated process received by the thermostat 220 is used in controlling an HVAC system associated with a property. For example, a process or updated process relating to how a thermostat controls an air conditioner of an HVAC system can be used to determine when the thermostat should turn the air conditioner on and off in order to achieve and maintain a user-identified target temperature. A process or updated process may cause the thermostat to activate the air conditioner, for example, at all times while a temperature within the property is two or more degrees above the user-identified target temperature, to activate the air conditioner for five minutes before deactivating the air conditioner for five minutes while the temperature at the property is zero to two degrees above the target temperature, and to turn the air conditioner off while the temperature within the property is less than or equal to the target temperature. While the received and/or updated processes used by the dynamically programmable thermostat 220 to control the HVAC system can alter the functionality of the HVAC system, the received and/or updated processes generally do not affect user-identified target conditions for property, e.g., a user-identified preferred temperature and/or humidity level within the property. Rather, a process or updated process can use the user-identified target conditions as inputs in determining operation of the HVAC system and how the HVAC system is controlled to reach the target conditions.

In some implementations, the dynamically programmable thermostat 220 can be capable of intelligently updating and/or learning control processes for operating an HVAC system associated with a property. For example, the thermostat can track the operation of an HVAC system over a period of time as well as changes in environmental conditions within the property over the period of time, and the thermostat can dynamically update control processes based on the tracked operation and environmental conditions data. In some instances, the dynamically programmable thermostat 220 can be capable of learning and/or updating control processes based on neural network learning techniques, or based on other computer learning processes. In some instances, the dynamically programmable thermostat 220 can use intelligent updating and/or learning to alter control values used by a control process, to alter rules associated with a control process, or to select or update particular computer code used to control the HVAC system associated with the property.

In some instances, control process learning and/or updating can be used to increase the efficiency of an HVAC system associated with a property. For example, updates to a control process can be received by a dynamically programmable thermostat 220 and/or the thermostat can intelligently update or perform learning with respect to a control process to increase the energy efficiency of the HVAC system. For example, a dynamically programmable thermostat 220 capable of intelligently updating a control process can use feedback data indicating energy efficiency of the HVAC system in conjunction with data indicating an operating history of the HVAC system to update a control process, with the aim of the updated process being to increase the energy efficiency of the HVAC system operation.

In some implementations, a control process can be updated to increase the effectiveness of an HVAC system in achieving user-identified environmental conditions within a property. For example, updates to a control process can be received by a dynamically programmable thermostat 220 and/or the thermostat can intelligently update or perform learning with respect to a control process to increase the effectiveness of the HVAC system in achieving user-identified conditions. For example, a dynamically programmable thermostat 220 can receive and implement an updated control process that is based on historical data indicating the rate and accuracy with which the HVAC system achieves user-identified conditions in conjunction with data indicating an operating history of the HVAC system, and the updated process can be used to increase the rate at which the HVAC system can match environmental conditions within the property to user-identified target conditions.

In some implementations, information relating to environmental conditions at the property, activity at the property, current weather, and/or weather forecasts can be obtained and can be used to determine the operation of the HVAC system controlled by the dynamically programmable thermostat 220. For example, environmental data and/or data indicating activity at the property can be obtained from one or more sensors associated with the module 230, and weather conditions and/or weather forecasts can be obtained from the thermostat application server 260 or using connections to one or more networks 205. Based on the information, the operating processes and/or the operation of the HVAC system can be updated.

In some instances, an operating process and/or the operation of an HVAC system associated with a property can be updated to conserve energy during particular times. For example, based on activity sensors at a property determining that no residents of the property are at the property during the daytime for the days Monday through Friday, an operating process for the HVAC system associated with the property can be updated to conserve energy during those times. For example, operation of the HVAC system can be updated such that components of the HVAC system are operated or cycled less frequently, thereby causing the HVAC system to achieve a target temperature at a slower rate than if residents of the property are at the property. In another example, operation of the HVAC system can be updated based on no one occupying the property at a particular time such that the HVAC takes greater advantage of current and/or anticipated weather conditions at the property. For instance, based on weather data for a geographic region of the property indicating that outdoor temperatures will be closer to a target temperature at a time later in the day when residents of the property typically return home, the HVAC system may operate to take advantage of the changing temperatures, thereby increasing energy efficiency. For example, components of the HVAC system may be operated at a reduced cycling frequency to reduce energy consumption while still reaching a target temperature by the time residents typically return to the property. In another example, an operating process associated with an HVAC system having an air conditioner can indicate that the air conditioner should turn on in the event that the outside temperature at the property is above a certain temperature, regardless of the internal property temperature. By turning on the air conditioner prior to the temperature in the property increasing drastically, the HVAC system may achieve overall improved energy efficiency.

In some instances, operating processes can be dynamically updated and/or dynamically evolve to incorporate additional variables, e.g., environmental data, activity, weather, resident locations, etc., and data from different sources, e.g., from mobile devices 240, 250 associated with residents of the property, weather service providers, etc. In some instances, operating processes can be updated and/or evolve to incorporate additional variables based on data pertaining to the additional variables becoming available or sufficient to use in updating and/or evolving the control processes.

For example, weather data can be incorporated into a process for controlling an HVAC system based on obtained weather data being available and/or being sufficient to demonstrate weather patterns or trends. The weather data can be incorporated into a control process associated with the HVAC system to increase the efficiency of HVAC system operation, to schedule HVAC system operation based on weather forecast data, or to control an HVAC system based on a target energy usage amount or energy usage cost for a period of time, e.g., to save energy consumption at a particular point in time based on a weather forecast indicating a future heat wave that will prompt increased energy usage. In some examples, energy consumption data can be incorporated into processes for operating an HVAC system, where the energy consumption data can be used to determine operation of the HVAC system based on a predicted energy usage amount or predicted energy cost associated with operating the HVAC system for a certain period of time. In some instances, energy consumption data can be data collected from the property and/or from the HVAC system associated with the property, and can be based on energy consumption data collected from the property over a period of time. In still other examples, data relating to user activity, resident locations, and/or user inputs relating to the HVAC system can be incorporated in an HVAC system control process by updating the process and/or by the process evolving, e.g., through a computer learning technique. For example, user inputs that have been tracked over time can indicate that a user frequently increases the target temperature for a property when leaving the property, and a process for controlling the HVAC system of the property can incorporate this data, for example, by affecting how the HVAC system achieves a target user-input temperature during times when residents are away from the property.

In some instances, performance, energy efficiency, maintenance needs, and other information regarding an HVAC system or components of an HVAC system can be accessed over one or more networks 205 associated with the dynamically programmable thermostat 220. For example, the thermostat control unit 210 can operate as a gateway device, and installers, technicians, or other users can access information relating to the status of the HVAC system or one or more HVAC system components. In some instances, accessing the information can involve accessing the information over one or more networks using a native control application 142, 152 associated with a mobile device 240, 250, can involve accessing the information via the thermostat application server 260, or can involve accessing the information using another device over one or more networks 205, e.g., a website.

The dynamically programmable thermostat can utilize performance, energy efficiency, maintenance, and other information relating to an HVAC system to detect errors or faults in the HVAC system. Based on detecting an error, the dynamically programmable thermostat can report the error, for example, to an installer, technician, monitoring service provider, or home owner. In some instances, the error can be reported at a display of the dynamically programmable thermostat, or can be reported at a web or mobile-based application, for example, by transmitting information identifying the error over one or more networks 205.

For example, a boiler component of an HVAC system associated with a dynamically programmable thermostat might report that it has an output temperature that is above an allowable limit and, in response, the boiler may be turned off. In this case, the dynamically programmable thermostat may additionally issue a report to users indicating that the boiler was turned off due to the boiler's output temperature being outside of the allowable limit. In another example, a fault relating to an air conditioner can cause the air conditioner to run constantly without achieving a target temperature in a home. Such a fault may result in many errors being detected by the system. A first error may be reported by the dynamically programmable thermostat indicating that the target temperature has not been achieved despite the air conditioner being active. A second error may be reported based on temperature sensors within the home indicating that the temperature within the house has not reached the target temperature within a sixty minute period, when a typical time to reach the target temperature is forty minutes. Still a third error may be reported based on determining that the HVAC system is consuming 4.0 kWh of energy per hour when typical energy consumption levels are 2.5 kWh of energy per hour. Thus, error and fault detection can utilize robust and redundant methods to accurately report errors, and can monitor the entire home and HVAC system as opposed to only individual HVAC system components.

In some implementations, the dynamically programmable thermostat 220 can include or be adapted to include a dynamic serial interface that allows the thermostat to operate HVAC systems and HVAC system components featuring digital communication links. For example, the dynamically programmable thermostat 220 can feature dynamic 24 V relay connections and terminals, and can additionally or alternatively feature dynamic serial interfaces. In some instances, the dynamically programmable thermostat 220 featuring serial interfaces can be updated and/or upgraded to support new functionality for HVAC systems or HVAC system components, and/or can adapt to new protocols associated with use of HVAC systems or HVAC system components that feature serial interfaces. Such updates and/or upgrades can be achieved locally, for example, by transmitting the updates to the thermostat via a plug-in device or mobile device 240, 250, or can be achieved through a remote connection, for example, a connection to one or more networks 205.

Figure 3:
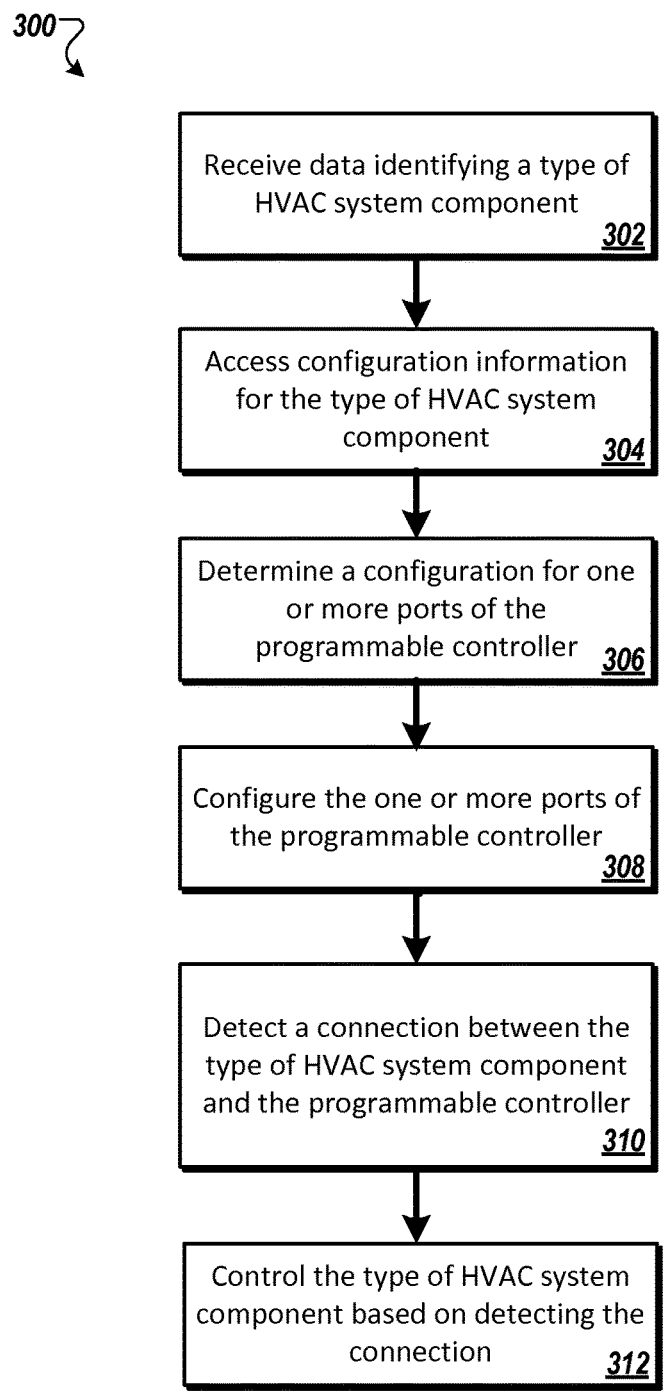
FIG. 3 illustrates a flow chart of an example process.

FIG. 3 illustrates an example process associated with configuring one or more HVAC system components to be controlled by a dynamically programmable thermostat. In some implementations, the process 300 can be performed by the system 200 of FIG. 2.

The system can receive data that identifies a particular type of HVAC system component (302). For example, a user of an HVAC system associated with a property can provide input at an interface of the dynamically programmable thermostat that specifies one or more particular types of HVAC system components that are to be controlled by the dynamically programmable thermostat. In some implementations, the information identifying the type of HVAC system component can be information that indicates a function of the HVAC system component, such as information that indicates that the HVAC system component is an air conditioner, humidifier, furnace, fan, boiler, or other HVAC system component. In some implementations, the information can additionally or alternatively indicate a manufacturer of the HVAC system component, a model of the HVAC system component, a version or serial number of the HVAC system component, or other information that identifies the HVAC system component and that is necessary for determining the configuration and installation requirements of the HVAC system component. The information received that identifies the type of HVAC system component can be information that is received based on user input, or can be information determined by the dynamically programmable thermostat. For example, the dynamically programmable thermostat may identify a type of HVAC system component when the component is connected to the dynamically programmable thermostat. In this example, the dynamically programmable thermostat may identify the type of HVAC system component through communications exchanged with the HVAC system component.

Based on receiving the data identifying the particular type of HVAC system component, configuration information for the particular type of HVAC system component is accessed by the system (304). For example, based on receiving the data identifying the particular type of HVAC system component, the dynamically programmable thermostat can transmit the information identifying the particular type of HVAC system component to the thermostat application server. The thermostat application server can receive the information identifying the particular type of HVAC system component from the dynamically programmable thermostat, and can access configuration information for the particular type of HVAC system component.

In some implementations, the system accesses the configuration information at a database maintained by the thermostat application server. In other implementations, the thermostat application server can access the configuration information for the particular type of HVAC system component at another resource that is accessible to the thermostat application server, for example, at one or more databases, web sites, or other resources that are accessible to the thermostat application server over one or more local networks or other networks. In addition, the dynamically programmable thermostat can access the configuration information directly, for example, without communicating the information identifying the particular type of HVAC system component to the thermostat application server. In such an implementation, the dynamically programmable thermostat can access the configuration information locally, for example, at a database maintained by the dynamically programmable thermostat, or can access the configuration information at a resource accessible to the dynamically programmable thermostat over one or more local or other networks.

The configuration information can be information that is usable to install, configure, and/or control the particular type of HVAC system component. For example, the configuration information can be information that specifies an installation procedure for installing the type of HVAC system component at a property associated with an HVAC system. The configuration information can specify one or more wiring diagrams usable to connect the type of HVAC system component to a thermostat and/or to other system components of an HVAC system. The configuration information can specify one or more control processes, operating parameters, or other information related to the control of the particular type of HVAC system component. Other information relevant to the installation and/or control of the particular type of HVAC system component can be included in the configuration information.

Based on accessing the configuration information for the type of HVAC system component, a configuration for one or more relays or other interface ports of the dynamically programmable thermostat can be determined (306). For example, based on the thermostat application server receiving the information identifying the particular type of HVAC system component and accessing configuration information for the particular type of HVAC system component, the thermostat application server can transmit the configuration information to the dynamically programmable thermostat. The dynamically programmable thermostat can receive the configuration information, and can determine a configuration of one or more of its relays or other interface ports based on the configuration information. For example, the relays or other interface ports of the dynamically programmable thermostat may be reconfigurable relays or other interface ports. Based on the received configuration information, the dynamically programmable thermostat can determine a configuration for one or more relays or other interface ports that will accommodate the necessary connections between the type of HVAC system component and the dynamically programmable thermostat. In some examples, the thermostat application server can determine the necessary configuration of the one or more relays or other interface ports of the dynamically programmable thermostat necessary to accommodate the connections between the type of HVAC system component and the dynamically programmable thermostat. Based on the thermostat application server determining the configuration information, the thermostat application server can provide the dynamically programmable thermostat with information specifying the determined configuration.

One or more of the relays or other interface ports of the dynamically programmable thermostat can be configured based on the determined configuration (308). For example, as described, the one or more relays or other interface ports of the dynamically programmable thermostat can be configurable relays or interface ports, and based on the dynamically programmable thermostat determining a configuration for the HVAC system or receiving information specifying a determined configuration for the HVAC system, the dynamically programmable thermostat can configure the relays or interface ports of the dynamically programmable thermostat according to the determined configuration.

The dynamically programmable thermostat can detect a connection between the particular type of HVAC system component and the dynamically programmable thermostat that satisfies the determined configuration (310). For example, a user of the HVAC system associated with the property can connect the terminals of the particular type of HVAC component to the configured relays or other interface ports of the dynamically programmable thermostat such that the connections between the type of HVAC system component and the dynamically programmable thermostat satisfy the determined configuration necessary for the dynamically programmable thermostat to control the type of HVAC system component. The dynamically programmable thermostat can detect these connections and determine that the connections satisfy the determined configuration.

In some examples, the dynamically programmable thermostat can detect a connection to a type of HVAC system component. For instance, the dynamically programmable thermostat can determine that an unknown HVAC system component has been connected to one or more relays of the dynamically programmable thermostat. The dynamically programmable thermostat can determine, access, or receive information that specifies the type of the connected HVAC system component and/or a determined configuration for the connections between the dynamically programmable thermostat and the type of the connected HVAC system component. The relays or other terminals of the dynamically programmable thermostat can then be reconfigured by the dynamically programmable thermostat such that the connections between the connected HVAC system component and the relays or other terminals of the dynamically programmable thermostat satisfy the determined configuration.

The dynamically programmable thermostat can control the type of HVAC system component (312). For example, based on detecting the connection between an HVAC system component of the particular type of HVAC system component and the dynamically programmable thermostat such that the connection satisfies the determined configuration, the dynamically programmable thermostat can begin to control the operation of the HVAC system component. Controlling the type of HVAC system component can involve controlling the HVAC system component according to one or more control processes, user preferences (e.g., a target temperature set by a user of the property associated with the HVAC system), HVAC system policies (e.g., an energy efficiency policy), etc. In some implementations, controlling the type of HVAC system component using the dynamically programmable thermostat involves the dynamically programmable thermostat sending signals to the HVAC system component to turn the HVAC system component on or off. In addition, the communications between the dynamically programmable thermostat and the HVAC system component can include more information, for example, information indicating a fan speed for a fan, or can include other information.

In some implementations, the dynamically programmable thermostat can receive information or feedback from the HVAC system component, and can control the HVAC system component based at least in part on the received information. For example, the dynamically programmable thermostat can receive information that indicates the energy consumption of the HVAC system component, and the dynamically programmable thermostat can control the HVAC system component based on the energy consumption information. For example, the dynamically programmable thermostat may control the HVAC system component according to an energy usage policy that specifies a maximum rate or amount of energy used by the HVAC system component or HVAC system as a whole, and can control (e.g., turn on or off) the HVAC system component based on the energy usage policy and the received energy consumption information. In some examples, the dynamically programmable thermostat can receive information from the HVAC system component that indicates a status or reports errors detected by the HVAC system component, and the dynamically programmable thermostat can control the HVAC system component based on the status or error report information. For example, based on receiving information indicating that a motor of an air conditioning unit is operating at a temperature that is above normal, the dynamically programmable thermostat can control the air conditioning unit by turning off the air conditioning unit, running the air conditioning unit less frequently (e.g., by cycling the air conditioner on and off), or by otherwise controlling the air conditioning unit.

In some implementations, the dynamically programmable thermostat can provide information for display to users of a property associated with the HVAC system that is based on the control of the HVAC system components and/or the information received from the HVAC system components. For example, based on receiving an error message from an air conditioner that indicates that the air conditioner motor is operating at a high temperature, the dynamically programmable thermostat can provide information at a display associated with the dynamically programmable thermostat that notifies users of the property associated with the HVAC system that the air conditioner may require repair and/or that the dynamically programmable thermostat has adjusted the operation of the air conditioner in response to the error.

Figure 4A:
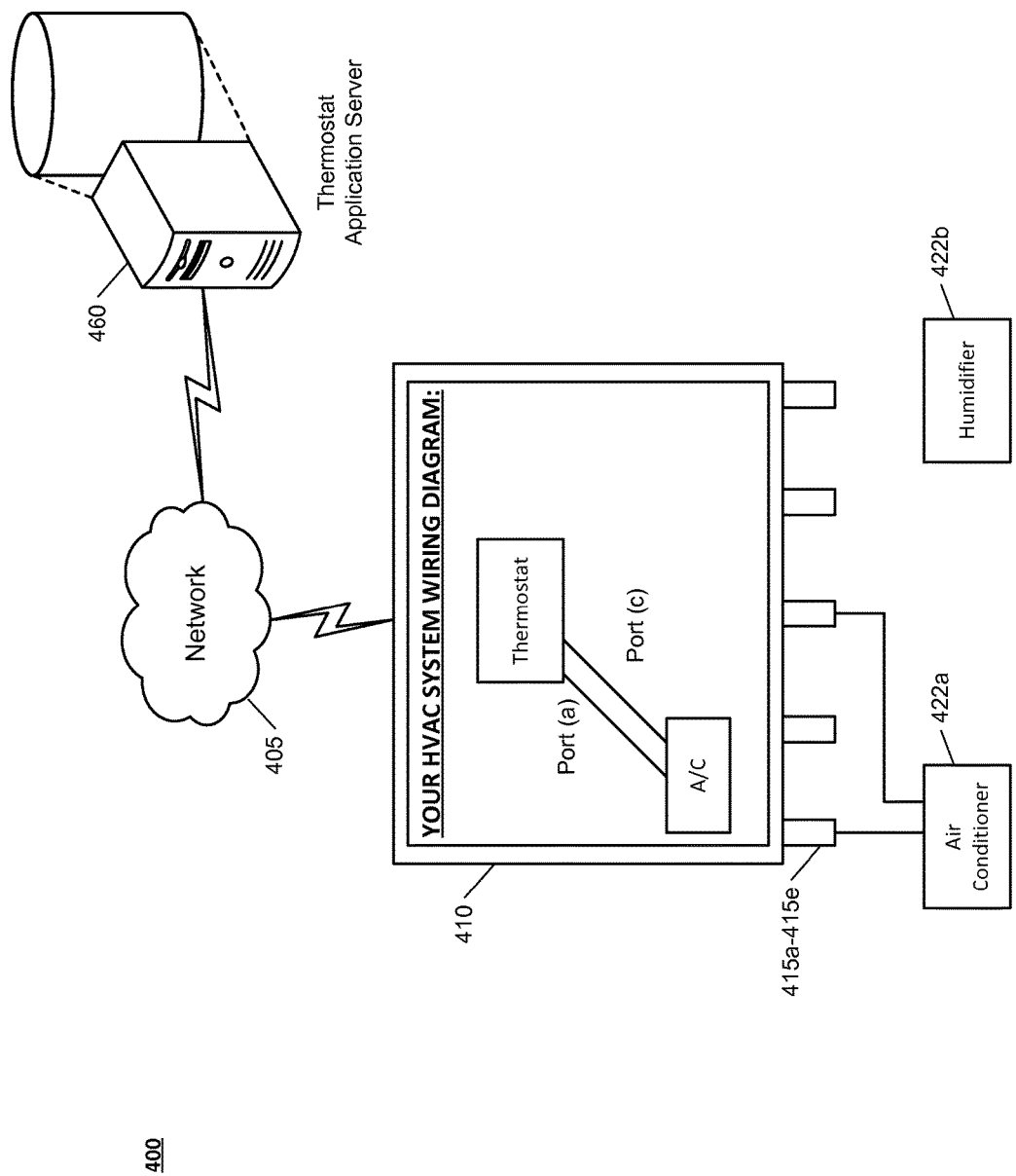
FIGS. 4A-4B illustrate an example of reconfiguring interface ports of a dynamically programmable thermostat.
Figure 4B:
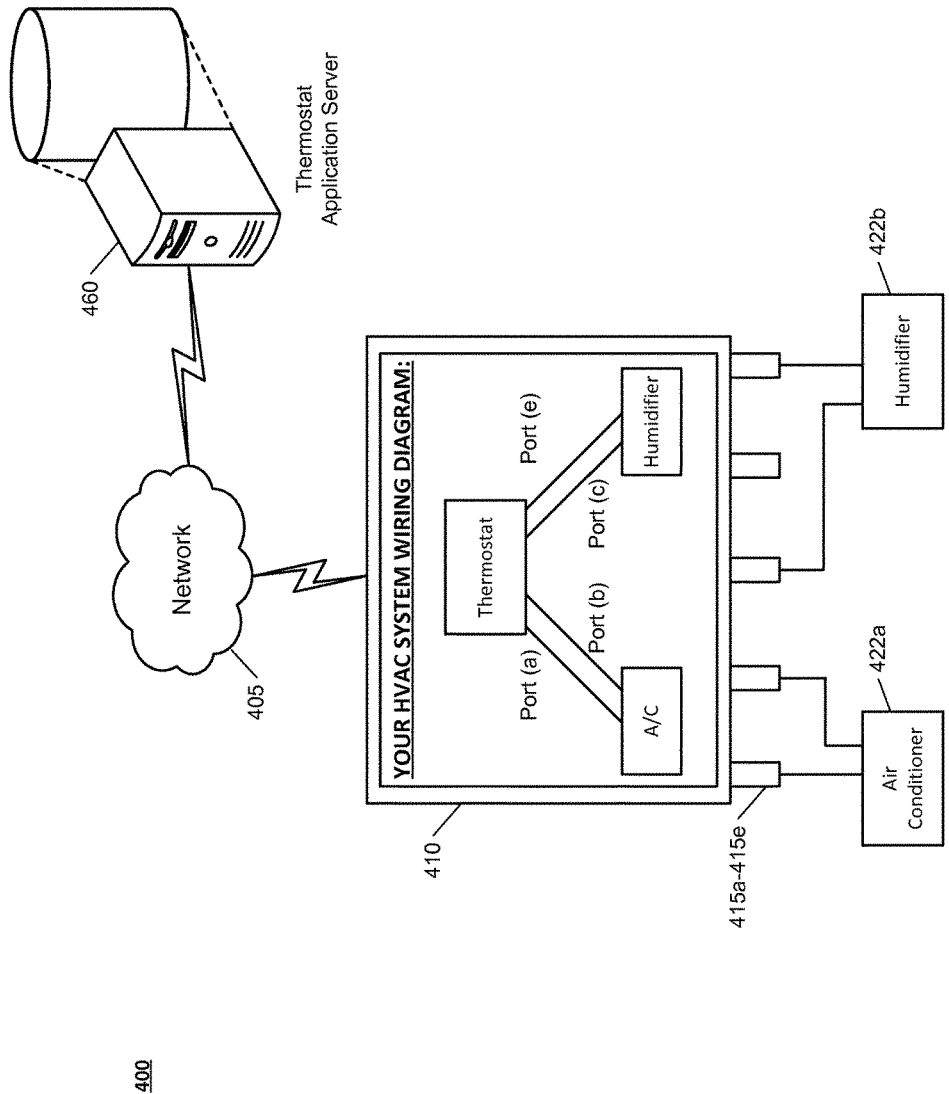

FIGS. 4A and 4B illustrate an example related to reconfiguring relays or other interface ports of a dynamically programmable thermostat. As discussed, the relays or other interface ports of a dynamically programmable thermostat can be configured to perform different functions and/or interface with different types of HVAC system components. The relays or other interface ports can also be dynamically reconfigured based on the configuration of the HVAC system associated with the dynamically programmable controller being modified. For example, when HVAC system components are added or removed from the HVAC system, the relays or other interface ports of the dynamically programmable thermostat can be reconfigured to control the HVAC system components.

The HVAC system 400 of FIGS. 4A and 4B includes a dynamically programmable thermostat 410 associated with relays 415a-415e, a thermostat application server 460, an air conditioner 422a and a humidifier 422b. The dynamically programmable thermostat 410 can exchange communications with the thermostat application server 460 over a network 405.

At a first point in time, shown at FIG. 4A, the HVAC system 400 includes a single HVAC system component, the air conditioner 422a, which the dynamically programmable thermostat 410 has been configured to control. The dynamically programmable thermostat 410 displays, at an interface associated with the dynamically programmable thermostat 410, a wiring diagram for the current configuration of the HVAC system 400. Specifically, the display shows a wiring diagram in which the dynamically programmable thermostat 410 is connected to the air conditioner 422a by the relays 415a and 415c. The air conditioner 422a has been connected to the dynamically programmable thermostat 410 according to the determined configuration, that is, with the air conditioner 422a connected to relays 415a, 415c of the dynamically programmable thermostat 410. For example, one of the connections between the air conditioner 422a and the dynamically programmable thermostat 410 may be configured to control a fan associated with the air conditioner 422a, while another connection between the air conditioner 422a and the dynamically programmable controller 410 may be configured to control a cooling unit associated with the air conditioner 422a (e.g., to control whether the air conditioner 422a is cooling or is not cooling).

In some implementations, the determined configuration for the HVAC system 400 at the first point in time may have been determined by the dynamically programmable thermostat 410 and/or the thermostat application server 460 based on the dynamically programmable thermostat 410 receiving information identifying the air conditioner 422a. Based on the received information, the dynamically programmable thermostat 410 may have accessed configuration information associated with installing and/or controlling the air conditioner 422a. For example, the dynamically programmable thermostat 410 may have received information identifying the air conditioner 422a (e.g., based on user input provided at the dynamically programmable thermostat 410) and may have accessed the configuration information at the thermostat application server 460. Based on the configuration information, a configuration was determined for the HVAC system 400. For example, the dynamically programmable thermostat 410 and/or the thermostat application server 460 may have determined a configuration of the HVAC system 400 that would enable the dynamically programmable thermostat 410 to control the air conditioner 422a. Based on the determined configuration, the dynamically programmable thermostat 410 has configured one or more of its relays 415a-415e in accordance with the determined configuration. The dynamically programmable thermostat 410 also outputs a visualization of the determined configuration such that a user of a property associated with the HVAC system 400 is able to install and configure the air conditioner 422a to be controlled by the dynamically programmable thermostat 410.

At a second, later point in time, shown at FIG. 4B, a second HVAC system component, the humidifier 422b, has been added to the HVAC system 400. The HVAC system 400 at the second point in time is configured to control both the air conditioner 422a and the humidifier 422b. In configuring the HVAC system 400 to control both the air conditioner 422a and the humidifier 422b, the relays 415a-415e of the dynamically programmable thermostat have been reconfigured. As shown, while the air conditioner 422a shown in FIG. 4A was connected to the relays 415a, 415c of the dynamically programmable thermostat 410, the air conditioner 422a as shown in FIG. 4B is connected to the relays 415a, 415b of the dynamically programmable thermostat. Additionally, at the second point in time shown in FIG. 4B, the humidifier 422b, which was not previously connected to the dynamically programmable thermostat 410, is connected to the relays 415c, 415e of the dynamically programmable thermostat 410. Additionally, as shown in FIG. 4B, the interface associated with the dynamically programmable thermostat 410 displays the new configuration of the HVAC system 400. As shown, the wiring diagram of the HVAC system 400 has the dynamically programmable thermostat 410 connected to the air conditioner 422a through relays 415a, 415b, and the dynamically programmable thermostat 410 connected to the humidifier 422b through the relays 415c, 415e.

In some implementations, the determined configuration for the HVAC system 400 at the second point in time may be determined by the dynamically programmable thermostat and/or the thermostat application server 460. The configuration may be determined based on receiving information at the dynamically programmable thermostat 410 identifying the air conditioner 422a and the humidifier 422b, for example, information received based on a user input provided to the dynamically programmable thermostat 410 or information determined by the dynamically programmable thermostat 410 when the dynamically programmable thermostat 410 detects a connection to an HVAC system component. Based on the received information identifying the air conditioner 422a and the humidifier 422b, the dynamically programmable thermostat 410 may access configuration information associated with installing and/or controlling the air conditioner 422a and the humidifier 422b. For example, the dynamically programmable thermostat 410 may store or otherwise be able to access (e.g., at the thermostat application server 460) configuration information associated with the air conditioner 422a. The dynamically programmable thermostat 410 may also access configuration information associated with the humidifier 422b, for example, by accessing the information at the thermostat application server 460. Based on the configuration information, a configuration is determined for the HVAC system 400. For example, the dynamically programmable thermostat 410 and/or the thermostat application server 460 may determine a configuration for the HVAC system 400 that enables the dynamically programmable thermostat to control both the air conditioner 422a and the humidifier 422b. Based on the determined configuration, the dynamically programmable thermostat 410 has configured one or more of its relays 415a-415e in accordance with the determined configuration. For example, the dynamically programmable thermostat may have reconfigured the relays 415a-415e to control the air conditioner 422a through the relays 415a and 415b instead of the relays 415a and 415c as the system was configured to control the air conditioner 422a at the first point in time shown in FIG. 4A. In addition to configuring the relays 415a-415e, the dynamically programmable thermostat 410 also outputs a visualization of the determined configuration such that a user of a property associated with the HVAC system 400 is able use the visualization as a guide to installing and configuring the air conditioner 422a to be controlled by the dynamically programmable thermostat 410.

Figure 5A:
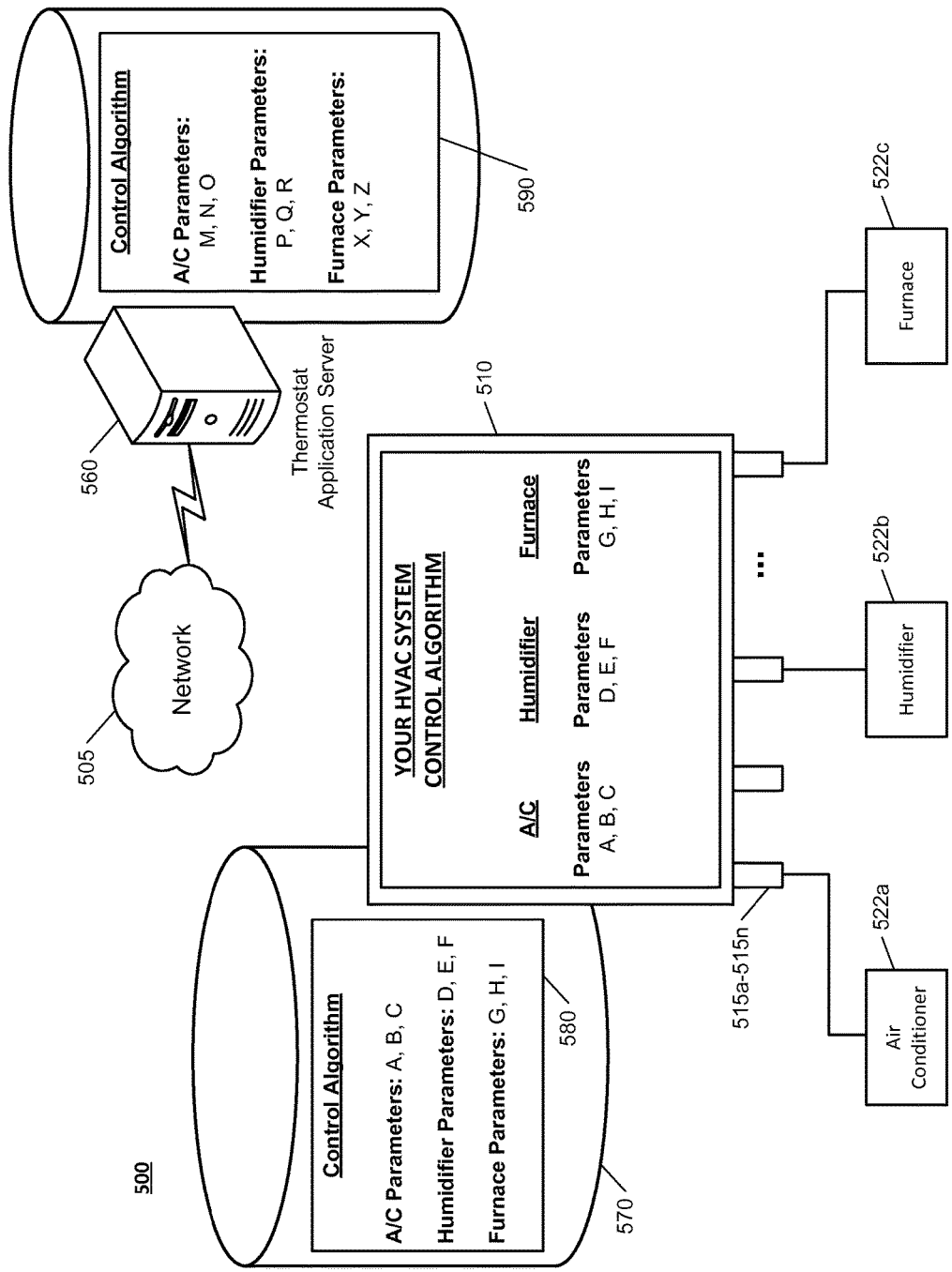
FIGS. 5A-5B illustrate an example of updating a control process associated with controlling HVAC system components using a dynamically programmable thermostat.
Figure 5B:
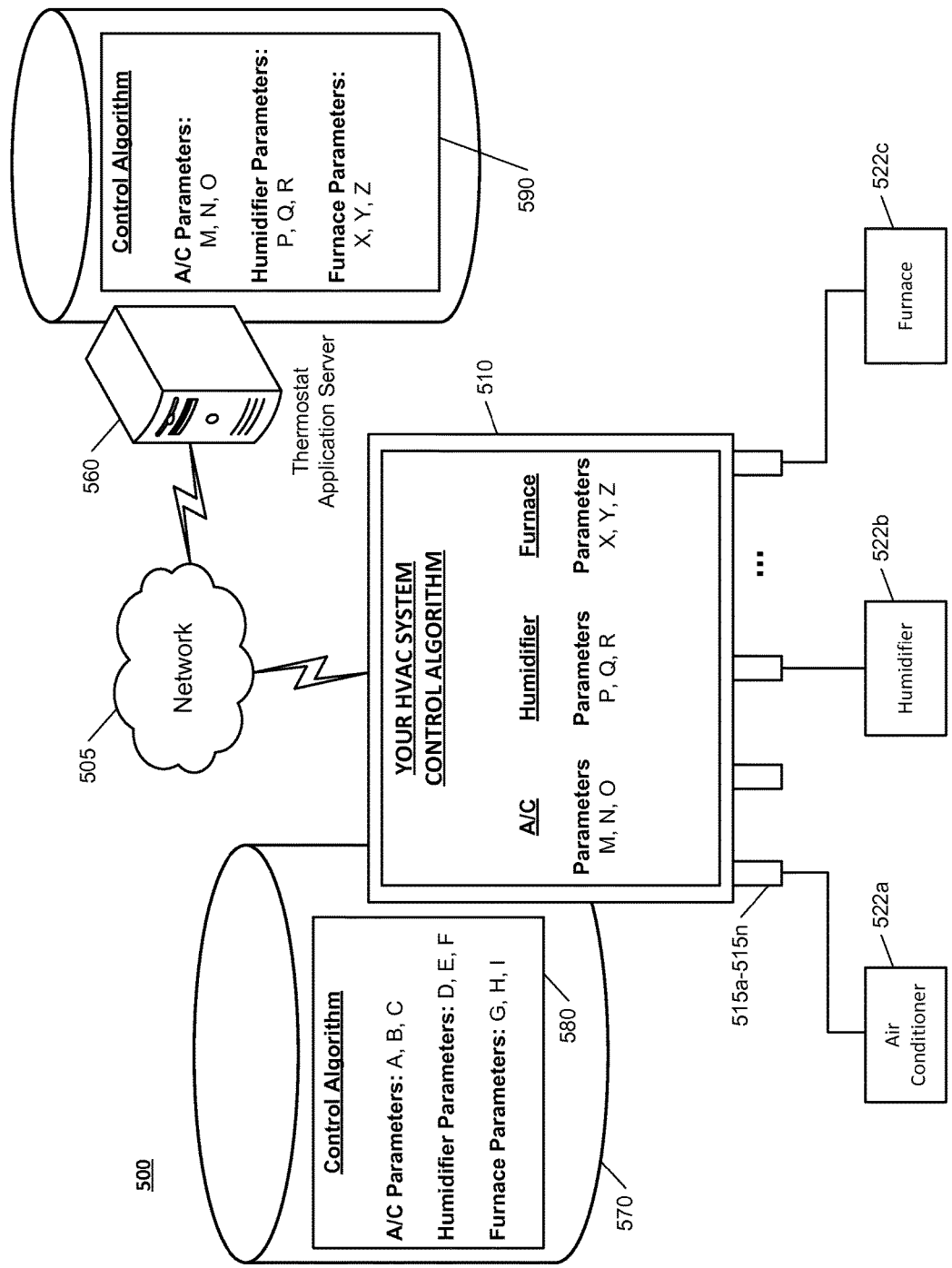

FIGS. 5A and 5B illustrate an example of updating a control process associated with controlling HVAC system components using a dynamically programmable thermostat. The HVAC system 500 of FIGS. 5A and 5B includes a dynamically programmable thermostat 510, a thermostat application server 560, an air conditioner 522a, a humidifier 522b, and a furnace 522c.

The dynamically programmable thermostat 510 is associated with a local database 570 or other data storage component that includes a control process 580 associated with controlling an HVAC system. In some examples, the control process 580 may be a generic control process, meaning that the control process 580 is not specific to the HVAC system 500. The control process 580 may include processes for controlling different types of HVAC system components, where the processes may each be associated with one or more parameters. For example, the control process 580 includes a process for controlling an air conditioner that is associated with the parameters A, B, and C. Similarly, the control process 580 includes a process for controlling a humidifier that is associated with the parameters D, E, and F, and a process for controlling a furnace that is associated with the parameters G, H, and I.

The thermostat application server 560 is associated with a database or other data storage component that includes a control process 590 associated with controlling an HVAC system 500. In some examples, the control process 590 may be specific to the HVAC system 500, or may otherwise be a preferred process for controlling the HVAC system 500 (e.g., the control process 590 may be superior to the control process 580 in one or more ways). The control process 590 may include processes for controlling different types of HVAC system components, where the processes may each be associated with one or more parameters. For example, the control process 590 includes a process for controlling an air conditioner that is associated with the parameters M, N, and O. Similarly, the control process 590 includes a process for controlling a humidifier that is associated with the parameters P, Q, and R, and a process for controlling a furnace that is associated with the parameters X, Y, and Z. In some examples, the processes of the control process 590 may each be specific to a particular type of HVAC system component of the HVAC system 500. For example, the air conditioner process may be specific to the air conditioner 522a, the humidifier process may be specific to the humidifier 522b, and the furnace process may be specific to the furnace 522c.

At a first point in time shown at FIG. 5A, the dynamically programmable thermostat 510 is not in communication with the thermostat application server 560. For example, the dynamically programmable thermostat 510 may not be able to communicate with the thermostat application server 560 based on the network 505 not being available, based on a power outage affecting the network 505 and/or the thermostat application server 560, or for another reason. Since the dynamically programmable thermostat 510 is not able to communicate with the thermostat application server 560, the dynamically programmable thermostat 510 may determine a configuration for the HVAC system 500 and may control the HVAC system 500 based on the control process 580. For example, the dynamically programmable thermostat 510 can determine a configuration for the HVAC system 500 such that the dynamically programmable thermostat 510 can control the HVAC system components 522a-522c, and the dynamically programmable thermostat 510 can control the configured HVAC system 500 according to the control process 580 that it accesses locally at the local database 570.

As shown in FIG. 5A, the dynamically programmable thermostat 510 can access the control process 580 and can use the processes of the control process 580 to control the HVAC system components 522a-522c. For example, an interface of the dynamically programmable thermostat 510, as shown in FIG. 5A, shows that the process being used by the dynamically programmable thermostat to control the air conditioner 522a is associated with the parameters A, B, and C, the process being used to control the humidifier 522b is associated with the parameters D, E, and F, and the process being used to control the furnace 522c is associated with the parameters G, H, and I. In some implementations, the dynamically programmable thermostat 510 can control the HVAC system components 522a-522c using the control process 580 for as long as the dynamically programmable thermostat 510 is not able to communicate with the thermostat application server 560.

At a second, later point in time shown at FIG. 5B, the dynamically programmable thermostat 510 has established communication with the thermostat application server 560 over the network 505. Based on having access to the thermostat application server 560, the dynamically controllable thermostat 510 can access the control process 590 that is stored at the database or other data storage component associated with the thermostat application server 560. The dynamically programmable thermostat 510 and/or the thermostat application server 560 can determine a configuration for the HVAC system 500 and the dynamically programmable thermostat 510 can configure one or relays 515a-515n according to the determined configuration. In some instances, the determined configuration can be specific to the control process 590, can be a configuration determined by the dynamically programmable thermostat 510 and/or the thermostat application server 560 based on data identifying the HVAC system components 522a-522c, or can be a configuration that is otherwise determined. In some implementations, reconfiguring the relays 515a-515n of the dynamically programmable thermostat 510 according to the determined configuration may require the connections between the dynamically programmable thermostat 510 and the HVAC system components 522a-522c to be updated. For example, a user of a property associated with the HVAC system 500 may be required to update the connections according to the determined configuration.

Based on the HVAC system 500 being configured according to the determined configuration and the dynamically programmable thermostat 510 accessing the control process 590, the dynamically programmable thermostat 510 can control the HVAC system components according to the control process 590. For example, the dynamically programmable thermostat 510 can access the control process 590 and can set, replace, or update the control process used by the dynamically programmable thermostat 510 to control the HVAC system components to use the control process 590. For example, the dynamically programmable thermostat 510 may update the processes used to control the HVAC system components 522a-522c from the processes associated with the control process 580 to the processes associated with the control process 590. As an example, the parameters of a process used to control the air conditioner 522a may be updated from the parameters A, B, and C as specified by the control process 580 to the parameters M, N, and O as specified by the control process 590. The parameters of a process associated with controlling the humidifier 522b may be updated from the parameters D, E, and F specified by the control process 580 to the parameters P, Q, and R specified by the control process 590. The parameters of a process associated with controlling the furnace 522c may be updated from the parameters G, H, and I specified by the control process 580 to the parameters X, Y, and Z specified by the control process 590. Based on the dynamically programmable thermostat 510 updating the control process used to control the HVAC system components 522a-522c to the control process 590, the dynamically programmable thermostat 510 can proceed to control the HVAC system 500 according to the control process 590.

In some examples, the control processes 580 and 590 may be updated, and the dynamically programmable thermostat 510 may update the control process used to control the HVAC system 500 based on the control processes 580, 590 being updated. In some implementations, the dynamically programmable thermostat 510 may store data defining the control process 590 at the local database 570, such that the dynamically programmable thermostat 510 may be able to access the control process 590 regardless of whether the dynamically programmable thermostat 510 is in communication with the thermostat application server 560.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A programmable controller associated with a heating, ventilation, and air conditioning (HVAC) system for a property, the programmable controller comprising:
   interface ports that are configurable in multiple settings that relate to multiple, different types of HVAC system components;
   at least one processor; and
   at least one computer-readable storage medium coupled to the at least one processor having stored thereon instructions which, when executed by the at least one processor, cause the at least one processor to perform operations comprising:
      receiving data identifying a particular type of HVAC system component that is to be controlled by the programmable controller;
      based on receiving the data identifying the particular type of HVAC system component, accessing configuration information for the particular type of HVAC system component;
      determining a configuration for one or more of the interface ports of the programmable controller based on the configuration information for the particular type of HVAC system component;

configuring the one or more interface ports of the programmable controller according to the determined configuration;

detecting a connection between the particular type of HVAC system component and the programmable controller that satisfies the determined configuration; and based on detecting the connection between the particular type of HVAC system component and the programmable controller that satisfies the determined configuration, controlling the particular type of HVAC system component through the one or more interface ports by:

accessing a first control process at a storage component of the programmable controller based on the programmable controller lacking network access, and accessing a second control process at a server in communication with the programmable controller based on the programmable controller having network access; and controlling the particular type of HVAC system component by the programmable controller according to the first control process based on the programmable controller having accessed the first control process but not the second control process, and controlling the particular type of HVAC system component by the programmable controller according to the second control process based on the programmable controller having accessed the second control process.

2. The programmable controller of claim 1:

wherein accessing the configuration information for the particular type of HVAC system component comprises accessing information that specifies a wiring arrangement used to enable a controller to communicate with the particular type of HVAC system component; and wherein determining the configuration for the one or more of the interface ports of the programmable controller based on the configuration information for the particular type of HVAC system component comprises determining a configuration for the one or more of the interface ports of the programmable controller that is compatible with the wiring arrangement used to enable a controller to communicate with the particular type of HVAC system component.

3. The programmable controller of claim 1:

wherein receiving the data identifying the particular type of HVAC system component that is to be controlled by the programmable controller comprises receiving user input that specifies the particular type of HVAC system component that is to be controlled by the programmable controller.

4. The programmable controller of claim 1:

wherein receiving the data identifying the particular type of HVAC system component that is to be controlled by the programmable controller comprises:

detecting a HVAC system component that has been connected to one or more of the interface ports of the programmable controller; and receiving, by the connection of the HVAC system component to the one or more of the interface ports of the programmable controller, data from the HVAC system component that specifies the particular type of HVAC system component.

5. The programmable controller of claim 1, wherein the operations comprise:

accessing data that specifies a process for configuring the particular type of HVAC system component to be controlled by the programmable controller;

generating a visual representation of the process for configuring the particular type of HVAC system component to be controlled by the programmable controller; and providing, for display, the visual representation of the process for configuring the particular type of HVAC system component to be controlled by the programmable controller.

6. The programmable controller of claim 1, wherein at least one of the first control process and the second control process comprises one or more parameters, and wherein the operations comprise:

receiving data that specifies updates to one or more of the parameters of the at least one of the first control process and the second control process;

updating at least one of the first control process and the second control process, based on the data that specifies the updates to the one or more of the parameters of the at least one of the first control process and the second control process; and controlling the particular type of HVAC system component by the programmable controller according to the updated at least one of the first control process and the second control process.

7. The programmable controller of claim 1:

wherein the programmable controller is a programmable thermostat; and wherein configuring the one or more interface ports of the programmable controller according to the determined configuration comprises configuring one or more 24V relays of the programmable thermostat or one or more digital relays of the programmable thermostat according to the determined configuration.

8. The programmable controller of claim 1, wherein the operations comprise:

receiving data identifying a second particular type of HVAC system component that is to be controlled by the programmable controller;

based on receiving the data identifying the second particular type of HVAC system component, accessing configuration information for the second particular type of HVAC system component;

determining a configuration for one or more other interface ports of the programmable controller based on the configuration information for the second particular type of HVAC system component;

configuring the one or more other interface ports of the programmable controller according to the determined configuration for the one or more other interface ports of the programmable controller;

detecting a connection between the second particular type of HVAC system component and the programmable controller that satisfies the determined configuration for the one or more other interface ports of the programmable controller; and based on detecting the connection between the second particular type of HVAC system component and the programmable controller that satisfies the determined configuration for the one or more other interface ports of the programmable controller, controlling the second particular type of HVAC system component through the one or more other interface ports in addition to controlling the particular type of HVAC system component through the one or more interface ports.

9. The programmable controller of claim 8, wherein controlling the second particular type of HVAC system component through the one or more other interface ports in addition to controlling the particular type of HVAC system component through the one or more interface ports comprises:
  accessing a third control process at a storage component of the programmable controller based on the programmable controller lacking network access, and accessing a fourth control process at a server in communication with the programmable controller based on the programmable controller having network access; and
  controlling the second particular type of HVAC system component by the programmable controller according to the third control process based on the programmable controller having accessed the third control process but not the fourth control process, and controlling the particular type of HVAC system component by the programmable controller according to the fourth control process based on the programmable controller having accessed the fourth control process.

10. The programmable controller of claim 1, wherein the interface ports of the programmable controller are dynamically configurable to connect to one or more different types of HVAC system components, and
  wherein configuring the one or more interface ports of the programmable controller according to the determined configuration comprises configuring one or more of the dynamically configurable interface ports of the programmable controller according to the determined configuration.

11. A method comprising:
  receiving data identifying a particular type of heating, ventilation, and air conditioning (HVAC) system component that is to be controlled by a programmable controller;
  based on receiving the data identifying the particular type of HVAC system component, accessing configuration information for the particular type of HVAC system component;
  determining a configuration for one or more interface ports of the programmable controller based on the configuration information for the particular type of HVAC system component, wherein the one or more interface ports are configurable in multiple settings that relate to multiple, different types of HVAC system components;
  configuring the one or more interface ports of the programmable controller according to the determined configuration;
  detecting a connection between the particular type of HVAC system component and the programmable controller that satisfies the determined configuration; and
  based on detecting the connection between the particular type of HVAC system component and the programmable controller that satisfies the determined configuration, controlling the particular type of HVAC system component through the one or more interface ports by:
    accessing a first control process at a storage component of the programmable controller based on the programmable controller lacking network access, and accessing a second control process at a server in communication with the programmable controller based on the programmable controller having network access; and
    controlling the particular type of HVAC system component by the programmable controller according to the first control process based on the programmable controller having accessed the first control process but not the second control process, and controlling the particular type of HVAC system component by the programmable controller according to the second control process based on the programmable controller having accessed the second control process.

12. The method of claim 11:
  wherein accessing the configuration information for the particular type of HVAC system component comprises accessing information that specifies a wiring arrangement used to enable a controller to communicate with the particular type of HVAC system component; and
  wherein determining the configuration for the one or more of the interface ports of the programmable controller based on the configuration information for the particular type of HVAC system component comprises determining a configuration for the one or more of the interface ports of the programmable controller that is compatible with the wiring arrangement used to enable a controller to communicate with the particular type of HVAC system component.

13. The method of claim 11:
  wherein receiving the data identifying the particular type of HVAC system component that is to be controlled by the programmable controller comprises receiving user input that specifies the particular type of HVAC system component that is to be controlled by the programmable controller.

14. The method of claim 11:
  wherein receiving the data identifying the particular type of HVAC system component that is to be controlled by the programmable controller comprises:
    detecting a HVAC system component that has been connected to one or more of the interface ports of the programmable controller; and
    receiving, by the connection of the HVAC system component to the one or more of the interface ports of the programmable controller, data from the HVAC system component that specifies the particular type of HVAC system component.

15. The method of claim 11, comprising:
  accessing data that specifies a process for configuring the particular type of HVAC system component to be controlled by the programmable controller;
  generating a visual representation of the process for configuring the particular type of HVAC system component to be controlled by the programmable controller; and
  providing, for display, the visual representation of the process for configuring the particular type of HVAC system component to be controlled by the programmable controller.

16. The method of claim 11, wherein at least one of the first control process and the second control process comprises one or more parameters, and wherein the operations comprise:
  receiving data that specifies updates to one or more of the parameters of the at least one of the first control process and the second control process;
  updating at least one of the first control process and the second control process, based on the data that specifies the updates to the one or more of the parameters of the at least one of the first control process and the second control process; and controlling the particular type of HVAC system component by the programmable controller according to the updated at least one of the first control process and the second control process.

17. The method of claim 11:
wherein the programmable controller is a programmable thermostat; and
wherein configuring the one or more interface ports of the programmable controller according to the determined configuration comprises configuring one or more 24V relays of the programmable thermostat or one or more digital relays of the thermostat according to the determined configuration.

18. The method of claim 11, comprising:
receiving data identifying a second particular type of HVAC system component that is to be controlled by the programmable controller;
based on receiving the data identifying the second particular type of HVAC system component, accessing configuration information for the second particular type of HVAC system component;
determining a configuration for one or more other interface ports of the programmable controller based on the configuration information for the second particular type of HVAC system component;
configuring the one or more other interface ports of the programmable controller according to the determined configuration for the one or more other interface ports of the programmable controller;
detecting a connection between the second particular type of HVAC system component and the programmable controller that satisfies the determined configuration for the one or more other interface ports of the programmable controller; and
based on detecting the connection between the second particular type of HVAC system component and the programmable controller that satisfies the determined configuration for the one or more other interface ports of the programmable controller, controlling the second particular type of HVAC system component through the one or more other interface ports in addition to controlling the particular type of HVAC system component through the one or more interface ports.

19. The method of claim 18, wherein controlling the second particular type of HVAC system component through the one or more other interface ports in addition to controlling the particular type of HVAC system component through the one or more interface ports comprises:
accessing a third control process at a storage component of the programmable controller based on the programmable controller lacking network access, and accessing a fourth control process at a server in communication with the programmable controller based on the programmable controller having network access; and
controlling the second particular type of HVAC system component by the programmable controller according to the third control process based on the programmable controller having accessed the third control process but not the fourth control process, and controlling the particular type of HVAC system component by the programmable controller according to the fourth control process based on the programmable controller having accessed the fourth control process.

* * * * *